United States Patent [19]
Kasagi et al.

[11] Patent Number: 4,546,377
[45] Date of Patent: Oct. 8, 1985

[54] CIRCUIT ARRANGEMENT FOR PROCESSING COLOR TELEVISION SIGNALS

[75] Inventors: Yoshitaka Kasagi, Yokohama; Tokio Aketagawa, Kumagaya, both of Japan

[73] Assignee: Tokyo Shibaura Denki Kabushiki Kaisha, Kawasaki, Japan

[21] Appl. No.: 500,864

[22] Filed: Jun. 3, 1983

[30] Foreign Application Priority Data

Jun. 4, 1982 [JP] Japan .................................. 57-96024

[51] Int. Cl.⁴ ............................................. H04N 9/50
[52] U.S. Cl. ...................................... 358/23; 358/24; 358/26; 358/11
[58] Field of Search ....................... 358/23, 24, 26, 11

[56] References Cited

U.S. PATENT DOCUMENTS 3,716,665  2/1973  Morio et al. ........................... 358/24
4,148,058  4/1979  Harwood et al. ...................... 358/24

Primary Examiner—Richard Murray
Attorney, Agent, or Firm—Cushman, Darby & Cushman

[57] ABSTRACT

A circuit arrangement for processing color television signals incorporated in a multi-mode type color TV receiver which is capable of receiving TV signals processed by different television systems such as NTSC and PAL systems. The circuit arrangement for processing color television signals comprises a first color demodulator for demodulating a composite color signal by a first color subcarrier having a first phase with respect to a first demodulation axis, a second color demodulator for demodulating said composite color signal by a second color subcarrier having a second phase with respect to a second demodulation axis, a matrix circuit for producing a color demodulation signal having a third phase with respect to a third demodulating axis by vector-synthesizing the color demodulation signals delivered from said first and second color demodulators; and means for generating a correction vector signal so as to correct said third phase of the color demodulation signal produced by said matrix circuit in such a manner that said correction vector signal is added to said color demodulation signal of the matrix circuit so as to shift said third phase of the color demodulation signal with respect to said third demodulation axis.

15 Claims, 34 Drawing Figures

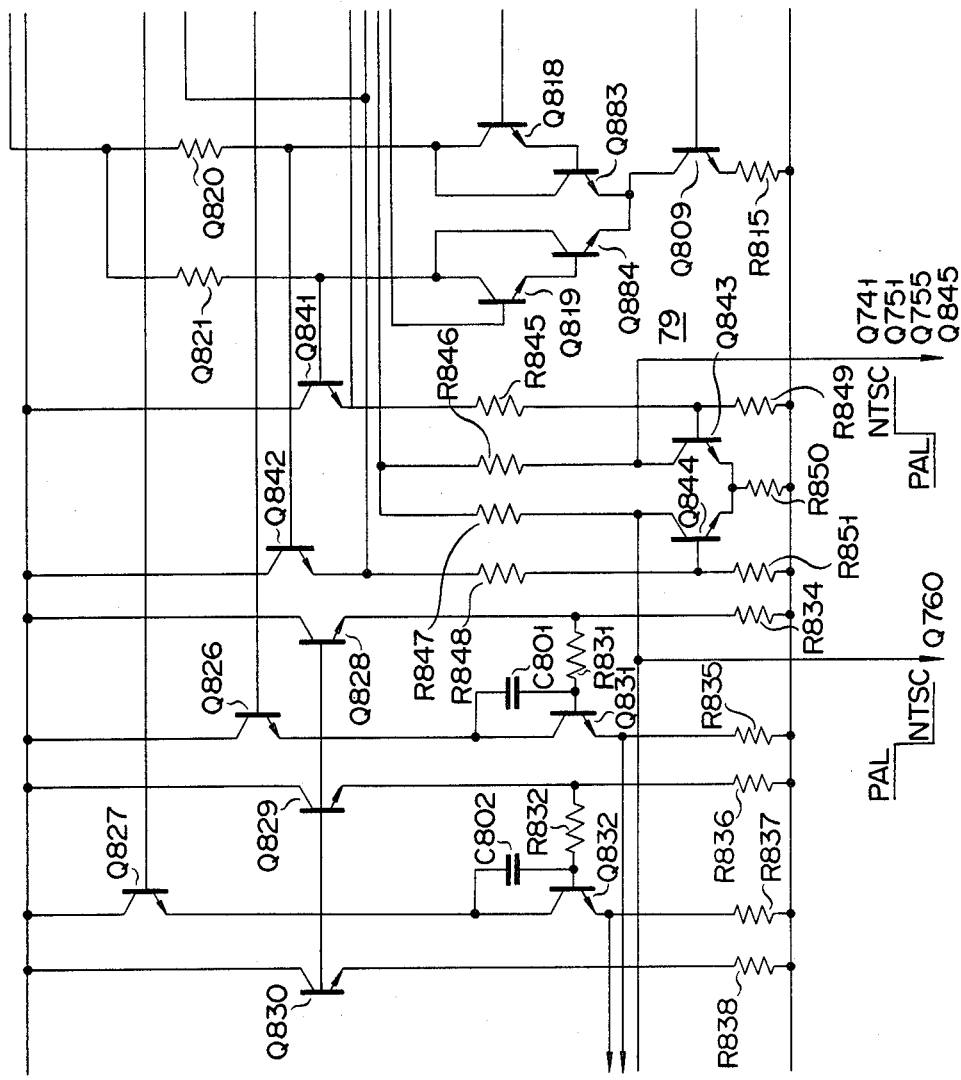
F I G. 6a

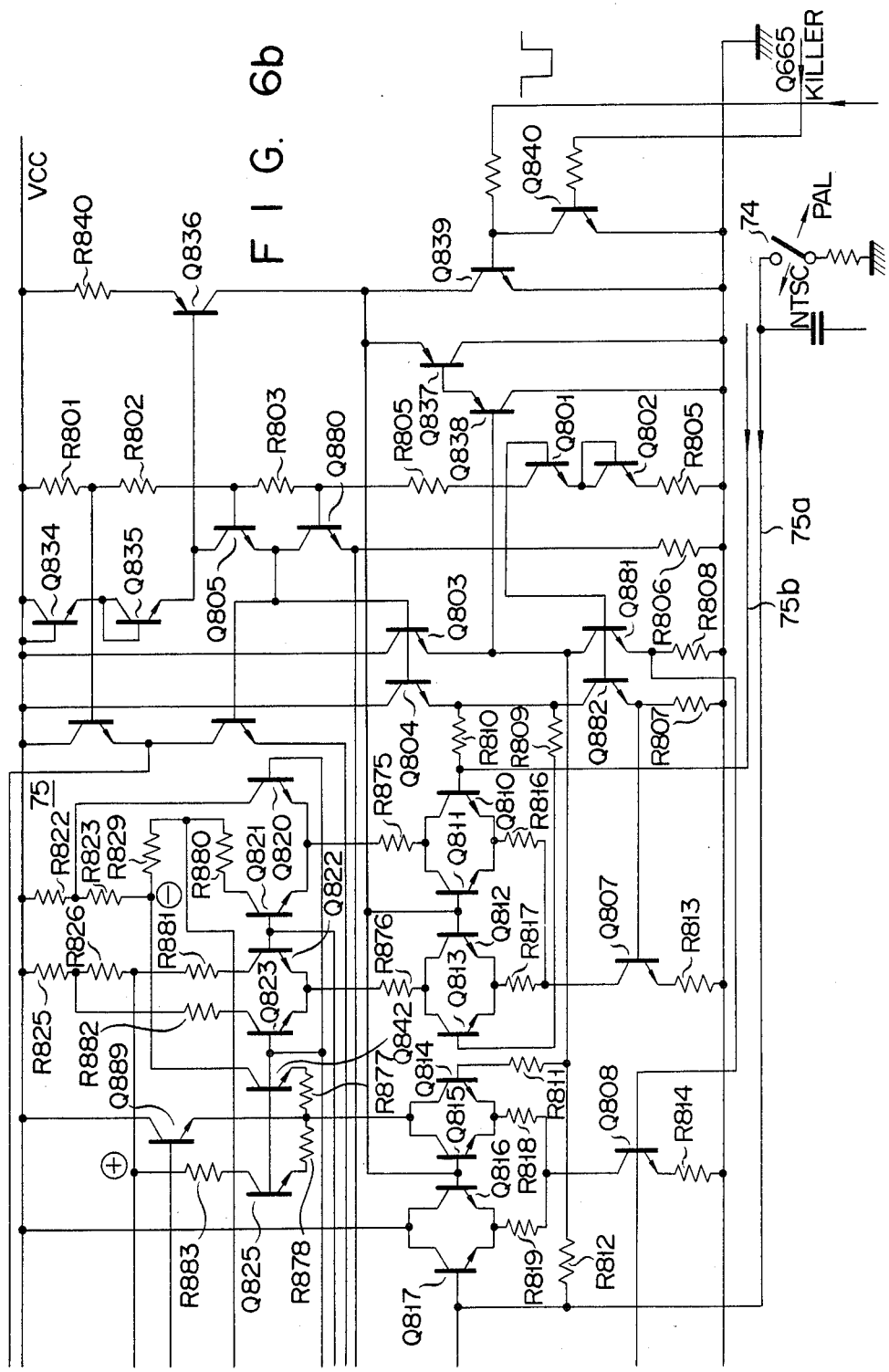

F I G. 11a 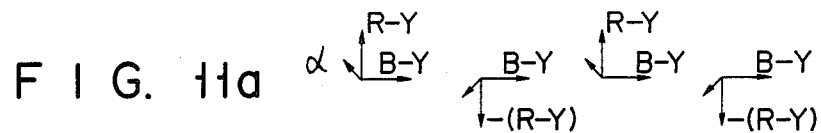
F I G. 11b 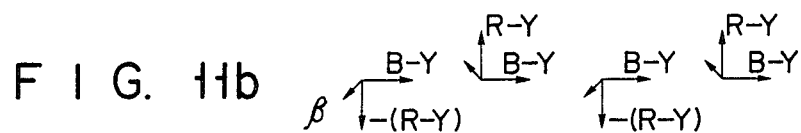
F I G. 11c 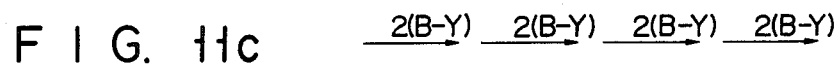
F I G. 11d 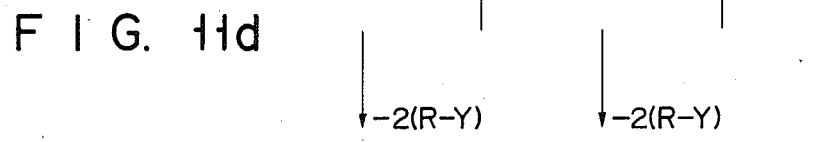
F I G. 12a 
F I G. 12b 
F I G. 12c 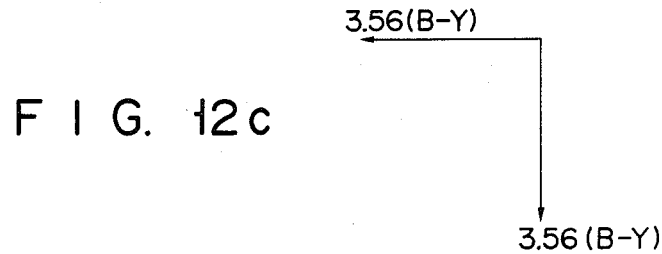

F I G. 16a
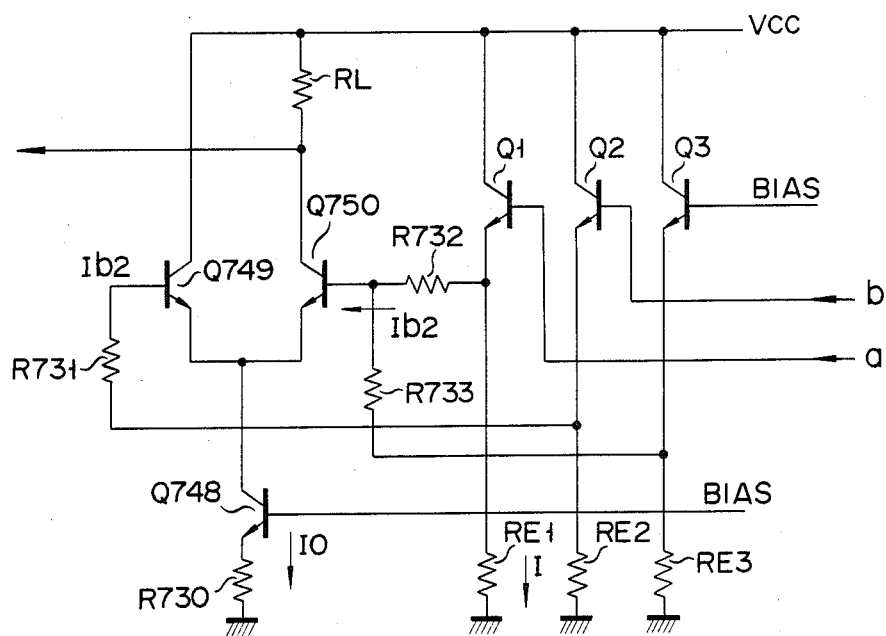

F I G. 16b
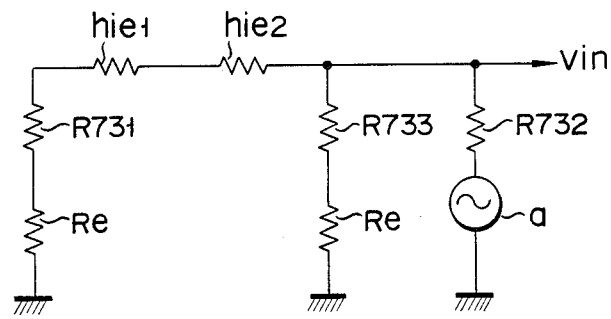
F I G. 16c
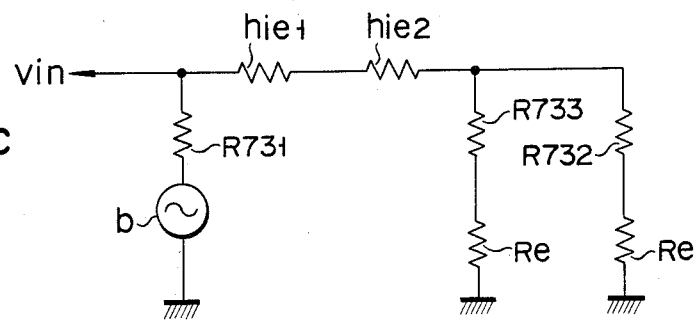
F I G. 17
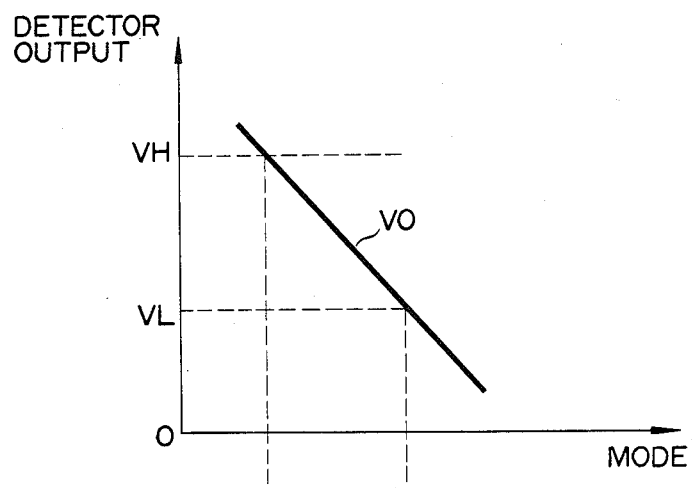

CIRCUIT ARRANGEMENT FOR PROCESSING COLOR TELEVISION SIGNALS

BACKGROUND OF THE INVENTION

This invention relates to a circuit arrangement for processing colour television signals incorporated in a multi-mode type colour TV receiver which is capable of receiving TV signals processed by different television systems such as NTSC and PAL systems.

As is well known, three TV systems i.e., NTSC, PAL and SECAM are currently in use. Consequently, there is considerable commercial demand to develop a single colour television receiver, a so-called "a multi-mode type receiver" that can receive different systems of TV signals. This is because, although different countries employ different TV systems, recent progress in satelite colour television broadcasing and also the advent of video tape recorders have made international broadcasing and viewing practical.

In the conventional multi-mode type colour television receiver, independent signal processing circuits are assembled to process each TV system. However, in such a receiver, due to the great numbers of circuit elements employed in the receiver, power consumption increases, manufacturing costs increase, and product reliability deteriorates.

To mitigate these conventional drawbacks a multi-mode type receiver was recently developed in which the total number of circuit elements was reduced by introducing common use circuit portions as much as possible. For example, the known multi-mode type colour television receiver can process both NTSC and PAL TV signals.

Specific circuit portions for each system in the NTSC and PAL colour TV receivers will now be explained with reference to FIGS. 1 and 2.

FIG. 1 shows a circuit diagram of the known colour signal processing circuit of the NTSC colour television receiver. The numeral 11 denotes an input terminal for a chroma signal and the numeral 12 indicates a bandpass amplifier. The bandpass amplifier 12 includes an automatic colour control circuit (ACC) and a burst-gated amplifier; the former detects a level variation of the input signal so as to automatically maintain the output level constant, and the latter separates the input signal into the chroma signal component and the burst signal. The chroma signal separated in the bandpass amplifier 12 is input via a transmission path to a colour control circuit 14, which is amplified in accordance with auser's adjustment. The chroma signal derived from the colour control circuit 14 is supplied to a (B−Y) demodulator 15 and an (R−Y) demodulator 17. The burst signal separated in the bandpass amplifier 12 is supplied via a signal transmission path 18 to a hue control circuit 19. This hue control circuit 19 functions to correct the hue error caused by adverse influences on the signal during transmission in the signal path. This correction, too, is effected according to the user's adjustment. The burst signal which has been phase-adjusted in the hue control circuit 19 is supplied to a colour sync circuit 21 through a transmission path 20. The colour sync circuit 21 includes a colour reference subcarrier generator for generating a subcarrier necessary for colour demodulation, and a killer detector for discriminating whether a colour signal or a monochrome signal is being received. Outputs of the killer detector are supplied to either the colour control circuit 14 or the demodulators 15, 16, 17 so as to interrupt the function of these circuits, so that colour noises are not produced by them when receiving the mono-chrome TV signals. The reference subcarrier generator causes an automatic phase control function to correctly follow the phase of the input burst signal, generates the subcarriers for demodulation based upon the phase of the burst signal, and supplies them via the transmission paths 22, 23 to the (B−Y) demodulator 15, and the (R−Y) demodulator 17. The demodulators 15 and 17 both deliver positive and negative polarity outputs. For example, they deliver the positive polarity outputs to each of their output terminals 27 and 29 in accordance with the polarity of the picture tube driving circuit connected to the output stages of the demodulators, and also the negative polarity outputs via the transmission paths 25, 26 to a matrix (G−Y) demodulator 16 so as to obtain the (G−Y) output signal at the (G−Y) output terminal 28.

FIG. 2 shows a circuit diagram of the known colour signal processing circuit of the PAL TV signal receiver. Circuit elements having the same functions as in FIG. 1 are indicated by the same numbers. A chroma signal output from the colour control circuit 14 is supplied to a 1 H delay line 31 and to a matrix circuit 33 through an attenuator 32. To this matrix circuit 33 the output from the 1H delay line 31 is also supplied. In the PAL matrix circuit 33, the chroma signal which is delayed by 1 H (1 horizontal sync period) and the chroma signal which is not delayed are matrixed so as to separate them into the (B−Y) signal component and the (R−Y) signal component. These signal components are supplied to the (B−Y) demodulator 15 and the (R−Y) demodulator 17 respectively. As is known, in the PAL system the modulation axis for the (R−Y) signal component is transmitted by being inverted by 180° every 1 horizontal sync period (=one line period). This is one of the features of the PAL TV system. That is, when a vector synthesizing operation is performed between the delayed chroma signal and the undelayed chroma signal, a subcarrier phase distortion with respect to the demodulation signal may be mitigated. Compared with the NTSC system, the PAL system provides the advantages that, since an adverse influence on the phase distortion is not substantially given to the PAL signal in the transmission paths, the hue control circuit can be omitted and the burst signal separated in the bandpass amplifier 12 can be directly supplied to the colour sync circuit 21 to be used to generate a signal as a reference subcarrier. A subcarrier for the (B−Y) demodulation obtained in the colour sync circuit 21 is supplied to the (B−Y) demodulator 15. A subcarrier for the (R−Y) demodulation is supplied to a PAL switch circuit 34 which is driven by horizontal flyback pulses and inverted every 1 H period, in which the subcarrier is subject to a phase correction. The phase-corrected subcarrier is then supplied to the (R−Y) demodulator 17. The inverting operation of the PAL switch circuit 34 is controlled by the output information of the colour killer which is obtained from a killer detector in the colour sync circuit in such a manner that the subcarrier is in-phase with the transmission signal. When receiving the PAL TV signal, an output of a flip-flop circuit in the PAL switch circuit 34 is inverted and non-inverted by the horizontal flyback pulses, but this inverting operation is interrupted for 1 H period by the so-called ident signal upon receipt for the colour killer signal, with the result that it is controlled to realize the normal phase relation between the subcarrier for the (R−Y) demodulation and the transmission signal.

A common processing circuit may be conceived as shown in FIG. 3 from each independent processing circuit.

In FIG. 3, the same functional circuit elements have the same symbols as in FIGS. 1 and 2. This common processing circuit further comprises a system selection circuit 35 and system selection means 36. The circuit 35 may switch operations of the PAL matrix circuit 33, the PAL switch circuit 34 and the hue control circuit 19 for the PAL or the NTSC system. When receiving the PAL TV signals, the control function of the hue control circuit 19 is interrupted, and the burst signal separated in the bandpass amplifier 12 is introduced into the colour sync circuit 21 without any processing. When receiving the NTSC TV signals, the chroma signal delivered from the colour control circuit 14 is supplied via a part of the PAL matrix circuit 39 to the (B−Y) demodulator 15 and the (R−Y) demodulator 17, in which the chroma signal is not matrixed. A subcarrier for the (R−Y) demodulation derived from the colour sync circuit 21 is supplied to the (R−Y) demodulator 17 via a part of the PAL switch circuit 34 in which the phase of the signal is not inverted.

As explained above, the signal processing circuit in FIG. 3 switches its signal processing paths in response to the TV systems. According to such a multi-mode signal processing circuit, the system selection circuit 35 may determine whether the chroma signal is matrixed or not and the PAL switch circuit 34 may determine whether the (R−Y) demodulation axis is inverted by 180° or not every 1 H period. That is, the phase processing functions in the colour signal processing circuit are selected in response to the PAL or the NTSC TV signal.

Points of difference between the PAL and the NTSC systems are listed up in TABLE 1.

TABLE 1

| | | PAL system | NTSC system |
|---|---|---|---|
| $\frac{(B-Y)}{(R-Y)}$ | (Amplitude ratio of demodulation signal components) | 1.8 | 1 |
| $\frac{(G-Y)}{(R-Y)}$ | (Amplitude ratio of demodulation signal components) | 0.6 | 0.3 |
| (R−Y)−(B−Y) | (Phase difference between demodulation signal components) | 90° | 105° |
| (G−Y)−(B−Y) | (Phase difference between demodulation signal components) | 240° | 240° |

TABLE 1 shows that, assuming that the amplitude ratio of demodulation signal components between (B−Y) and (R−Y) is calculated and the resultant ratio is defined as "1", there is a difference between the PAL system and the NTSC system. These ratios are obtained by detecting the amplitudes of the demodulation signal components when transmitting basic colour signals (red, green and blue). Because the reference white colour (=colour temperature) at the transmitter end has a different value in each TV system, a difference exists in the demodulation ratio. Consequently, in the above-mentioned common mode type colour processing circuit, it is also necessary to change the circuit gain in order to realize the desired amplitude ratios as shown in TABLE 1.

Demodulation axes for each signal component of the NTSC and PAL systems will now be explained. The (B−Y) signal component and the (R−Y) signal component are supplied to the (B−Y) demodulator 15 and the (R−Y) demodulator 17 respectively. To these (B−Y) and (R−Y) demodulators 15 and 17, subcarriers for (R−Y), (B−Y) demodulations generated in the colour sync circuit 21 are respectively supplied. When receiving the NTSC signals, a phase difference of 105° is set between the subcarriers for (B−Y) and (R−Y) demodulation (refer to FIG. 4C). On the other hand, a phase difference of 90° is ser between them (refer to FIG. 4b). The subcarrier for (R−Y) demodulation is inverted inphase in every 1 H period. As explained above, these demodulation axes for the (B−Y) and (R−Y) signal components are determined by a subcarrier generated by the colour sync circuit 21. However, as to demodulation of the (G−Y) signal components, the (G−Y) demodulator 16 employing a known matrix circuit is used.

FIG. 4a is a simplified circuit diagram of the (B−Y), (G−Y) and (R−Y) demodulators 15, 16 and 17. In the (B−Y) demodulator 15, numeral 42 is a phase detector utilizing a double balanced differential amplifier, and numeral 41 is a constant current source. A subcarrier for the (B−Y) demodulation (CWB) and a chroma signal (CRO) are applied to the phase detector 42, at the output terminals 42a and 42b of the phase detector 42, the polarities of the detector outputs of which are opposite to each other, i.e., the demodulated outputs for the (B−Y) component are obtained. One of these demodulated outputs is delivered from an output terminal 27 via an output resistor of (B−Y) demodulation 43. The remaining output is applied to the (G−Y) demodulator 16. The (R−Y) demodulator 17 is constructed similar to the (B−Y) demodulator 15, and comprises a phase detector 46 and a constant current source 45. Into this phase detector 46 the subcarrier for the (R−Y) demodulation (CWB) and the chroma signal (CRO) are input. At the output terminals 46a and 46b of the phase detector 46 the detector outputs having opposite polarities, i.e., the (R−Y) demodulated outputs, are obtained. One of these outputs is delivered from the terminal 29 via resistor 47. The remaining output is applied to the (G−Y) demodulator 16. The (G−Y) demodulator 16 is constructed between a power line and a reference ground potential line, there is connected a series circuit of resistor 48, 49 and a constant current source 50. The (B−Y) demodulation output is applied to a junction between these resistors 48 and 49, and the (R−Y) demodulation output is applied to a junction between the resistor 49 and the current source 50. Then the (G−Y) demodulation output is delivered from the output terminal 28 via a resistor 51.

This (G−Y) demodulation output is obtained by matrixing the (B−Y) demodulation output and the (R−Y) demodulation output. Since in the standard television transmission system a predetermined ratio is decided between a luminecent signal (Y) and three primary colour signals (R), (G), (B), the (G−Y) demodulation output may be necessarily defined by the remaining demodulation outputs.

Suppose that demodulation conversion conductances of the phase detectors 15, 17 are GB and GR, respectively. The respective amplitudes of demodulation outputs EB, ER and EG appearing at the output terminals 27, 29 and 28, and DC voltages VB, VR and VG are obtained as follows (ei=input signal).

$$EB = ei \cdot GB \cdot R43 \quad (1)$$

$$VB = VCC - \tfrac{1}{2} I41 \cdot R43 \quad (2)$$

$$ER = ei \cdot GR \cdot R47 \quad (3)$$

$$VB = VCC - \tfrac{1}{2} I45 \cdot R47 \quad (4)$$

$$EG = ei \cdot GB \cdot R48 + ei \cdot GR \cdot (R48 + R49) \quad (5)$$

$$VG = VCC - \tfrac{1}{2} I41 \cdot R48 - \tfrac{1}{2} I45 \cdot (R48 + R49) - I50(R43 + R47) \quad (6)$$

where R43, R47, R48 and R49 are resistance values of the resistors 43, 47, 48 and 49 respectively, and I41, I45 and I50 are currents flowing through the constant current sources 41, 45 and 50.

If proper values are selected so that the DC voltages VB, VR and VG are equal to each other, there is no DC level variation, nor variation in intensity of the picture screen when changing the PAL system and the NTSC system.

When receiving the PAL system, the DC voltages VB, VR and VG are set equal in their level in the demodulators 15, 16 and 17, and simultaneously EB/ER=1.8 and EG/ER=0.6 are set in order to satisfy the amplitude ratios shown in the TABLE 1. As a result, vectors of the demodulation signal components are demodulated as follows: $(R/Y)/(R-Y)=1.8$, $(G-Y)/(R-Y)=0.6$, a 90° phase difference between the (R−Y) and (B−Y) axes, and a 240° phase difference between the (G−Y) and (B−Y) axes.

Then, when the system changes the PAL reception into the NTSC reception, a vector as shown in FIG. 4c is obtained, and it should be noted that since these demodulators 15, 16, 17 are designed to be adapted to the PAL sytem, the amplitude ratios between (B−Y) and (R−Y), and between (G−Y) and (R−Y) are different from those for the NTSC system described in TABLE 1. Furthermore, because, those amplitude ratios are different from the listed values, the phase of the (G−Y) axis is shifted from a formal phase position (denoted by a broken line in the vector diagram). Accordingly, it is necessary to take measures to shift back the phase of the (G−Y) signal component to the formal phase position, and also to correct the amplitude ratios between (B−Y) and (R−Y), and between (G−Y) and (R−Y) to the values listed in the table.

As is well known, the (G−Y) demodulation output may be obtained by vector-synthesizing the (B−Y) and (R−Y) demodulation outputs. Namely, between the luminance signal (Y) and the three primary colour signals (R), (G), (B), the following relation exists:

$$Y = 0.30\,R + 0.59\,G + 0.11\,B$$

If (Y), (R−Y) and (B−Y) are determined, the (G−Y) demodulation output is obtained based upon the following relation:

$$(G-Y) = -0.51\,(R-Y) - 0.19\,(B-Y)$$

In designing such a multi-mode type colour TV receiver, there are a lot of problems in the colour signal processing circuit. For example, each of the demodulation axes (R−Y), (B−Y) and (G−Y) must be adapted to each of PAL and NTSC system, and furthremore, adequate values must be selected for the amplitude ratios for (B−Y)/(R−Y) and (G−Y)/(R−Y).

The multi-mode type colour television receiver is constructed to change the internal signal processing models. In this case it is necessary to avoid the signal level variation in accordance with the mode change. Furthermore it is perferable to utilize as many commonly-used circuit elements as possible, which provides both cost reduction and simple circuitry.

Finally, it is absolutely necessary to correct the phases of each signal as precisely as possible.

It is therefore a primary object to provide a circuit arrangement for processing colour television signals in which, by utilizing the subcarrier for the colour killer obtained from the phase-synthesizing circuit and the demodulation axes for the colour signal components in each TV system, the subcarrier which was used in processing colour TV signals of one TV system can be effectively used for processing colour TV signals of any other TV sytem.

It is a second object to provide a circuit arrangement for processing colour television signals in which, when the internal signal processing circuit portions in the PAL matrix circuit art switched into either the PAL processing mode or the NTSC processing mode, the amplitude ratios of the separated signals are automatically changed in such a manner that the changed amplitude ratios are perferable to process the signals in the latter stage and the demodulation outputs matching each TV system may be obtained.

It is a third object to provide a circuit arrangement for processing colour television signals, in which when the PAL matrix circuit is designed to be fitted to both TV system, signals applied to the demodulators are matrixed to be derived from two output terminals of the PAL matrix circuit in which the transmission characteristic in the PAL matrix circuit is prevented.

It is a fourth object to provide a circuit arrangement for processing colour television signals in which, when the matrixed output signals from the PAL matrix circuit are supplied to the commonly-used (B−Y) and (R−Y) demodulators, the colour signal processing circuit may set the proper (B−Y)/(R−Y) amplitude ratio for both TV systems in the PAL matrix circuit and also prevent a DC level variation with respect to the demodulators when changing the TV system.

It is a fifth object to provide a circuit arrangement for processing colour television signal in which, in connection with the flip-flop circuit whose operation mode is selectable for the PAL/NTSC sytems and the phase changing means in the phase synthesizing circuit is controlable to the flip-flop circuit, the flip-flop circuit is designed to have three level values for its first and second output voltages.

It is a sixth object to provide a circuit arrangement for processing colour television signals in which, when the PAL matrix circuit portion is changed from the PAL system to the NTSC system and vice verse, the colour signal processing circuit may employ as many commonly-used circuit elements as possible, hold a multi-function of the signal transmission and the switching, and further avoid a DC level variation when changing the TV systems.

It is a seventh object to provide a circuit arrangement for processing colour television signals in which, when the demodulation axes are shifted during the demodulation system change, e.g., the (G−Y) axis is shifted during a change of the PAL system into the NTSC system, the colour signal processing circuit having colour demodulators may correct such a phase shift so as to perform the correct colour demodulation for both TV signals.

It is a further object to provide a circuit arrangement for processing colour television signals in which the colour signal processing circuit having the colour demodulation circuits may adjust the demodulation signal levels (B−Y), (R−Y), (G−Y) to proper levels, and the demodulation circuits may be operated with stable DC levels when changing the TV reception systems.

It is a still further object to provide a circuit arrangement for processing colour television signals in which the colour signal processing circuit may provide such a phase synthesizing circuit that a variation in of the transistors constituting the phase synthesizing circuit will have substantially no adverse effect on the phases of the synthesized outputs.

SUMMARY OF THE INVENTION

In a circuit arrangement for processing colour television signals according to the present invention a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are quadrature-modulated on first and second modulation axes respectively, first and second subcarriers for demodulating said first and second colour difference signals being not inverted every horizontal line, comprising:

means for generating said second subcarrier which is used to demodulate said first composite colour signal and separated at a right angle with respect to said first subcarrier;

means for correcting a phase difference of said second subcarrier with respect to said first subcarrier to a certain angle except 90 degrees when demodulating said second colour difference signal of said second composite colour signal; and means for performing colour killer detection of said first composite colour signal in such a manner that a colour burst signal in said first composite colour signal and a colour killer detection subcarrier having said corrected phase difference are phase-detected.

Also in a circuit arrangement for processing colour television signals according to the present invention a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are quadrature-modulated on first and second modulation axes respectively, first and second subcarriers for demodulating said first and second colour difference signals being not inverted every horizontal line, comprising:

a first differential switching circuit into which a delayed signal is supplied via time delay means having one horizontal line and from which said delayed signal is delivered under the control of a first control signal;

a second differential switching circuit into which an undelayed signal is supplied and from which under the control of a second control signal, one signal of which phase is in phase with that of said undelayed signal and other signal of which phase is opposite to that of said undelayed signal are delivered;

a signal matrix circuit in which said signals output from said first and second differential switching circuits are vector-summarized and are performed in a vector-subtraction when processing said first composite colour signal, and from which resultants of said vector calculations are delivered through a first and second output terminals;

a system switch control circuit for generating a third control signal by which the matrix operation of said signal matrix circuit can be interrupted when processing said second composite colour signal, and a fourth control signal by which switching states of said first and second differential switching circuits can be changed over, so that it is blocked to appear said delayed signal at the output terminal of said first differential switching circuit and so that it is blocked to supply the inverted signal of said second differential switching circuit into said signal matrix circuit; and means for controlling gains of said first and second differential switching circuits under the control of the outputs from said system switch control circuit by changing over resistor networks constituting said signal matix circuit under the control of the outputs from said system switch control circuit.

Also in a circuit arrangement for processing colour television signals according to the present invention a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are quadrature-modulated on first and second modulation axes respectively, first and second subcarriers for demodulating said first and second colour difference signals being not inverted every horizontal line, comprising:

a colour killer detection circuit having one input terminal into which burst signals of said first and second composite colour signals are supplied, and other input terminal into which a subcarrier for the colour killer is supplied, said signals supplied to said both input terminals being phase-detected;

an ident circuit in which when processing said first composite colour signal, an invert control signal is generated to invert a subcarrier with respect to said second demodulation axis every 1 horizontal sync period in response to the detector output of the colour killer detection circuit, and which discriminates whether a phase of said subcarrier is synchronized with that of said burst signal in said first composite colour signal;

a flip-flop circuit of which output states are controlled to be first and second voltage levels in response to the output of the ident circuit;

phase changing means for inverting the phase of the subcarrier with respect to said second demodulation axis in accordance with the outputs of said flip-flop circuit responding to an output state of a system switch circuit from which a control voltage is generated to define whether said first or second composite colour signal is processed; and flip-flop interrupting means which interrupts said flip-flop circuit by dropping the output voltage of said system switch circuit when processing said second composite colour signal and interrupts said phase changing means by setting said both output levels of the flip-flop circuit to a third voltage level which is lower than said first and second voltage levels, said flip-flop circuit being interrupted when processing said second composite colour signal and an inversion of the subcarrier by means of said phase changing means being firmly interrupted.

In addition, in a circuit arrangement for processing colour television signals according to the present invention a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are quadrature-modulated on first and second modulation axes respectively, first and second subcarriers for demodulating said first and second colour difference signals being not inverted every horizontal line, comprising:

a system switch circuit for selecting whether said first or second composite colour signal is to be processed;

an inverted phase signal amplifier for amplifying an inverted phase signal of said first composite colour signal when said system switch circuit is selected in the mode of processing said first composite colour signal;

a non-inverted phase signal amplifier for amplifying the non-inverted phase signal of said first composite colour signal;

a first vector adding circuit for vector-adding the output of said non-inverted phase signal amplifier and the output of said inverted phase signal;

a second vector adding circuit for vector-adding said inverted phase signal and an signal obtained by inverting said non-inverted phase signal; and signal gain controlling means in which the signal inverting operation of the inverting phase signal amplifier is interrupted when said system switch circuit is selected in the mode of processing said second composite signal, and at the outputs of said first and second vector adding circuits, a signal for prcessing second composite colour signals of which gains are different from each other by controlling absolute values of the vectors in said first and second vector adding circuits.

A circuit arrangement for processing colour television signals according to the present invention also comprises:

a first phase detection circuit which has one input terminal into which a colour difference signal having a phase with respect to a first demodulation axis is supplied, and other input terminal into which a subcarrier on said first demodulation axis is supplied, and which phase-detects said both signals;

a second phase detection circuit which has one input terminal into which a colour difference signal having a phase with respect to a second demodulation axis, and other input terminal into which a subcarrier on said second demodulation axis, and which phase-detects said both signals;

a matrix circuit which synthesizes a demodulation signal with respect to a third demodulation axis by vector-synthesizing the output of said first phase detection circuit and that of said second phase detection circuit;

phase control means in which the phase of the subcarrier with respect to said second demodulation axis which is supplied to said other input terminal of said second phase detection circuit, is inverted every one horizontal sync period during the PAL signal process, and the phase of the subcarrier with respect to said second demodulation axis is different from that in case of the PAL signal reception when the NTSC TV signal is processed; and means for maintaining a relative amplitude ratio between the output signals of said first and second phase detection circuit to a given value without varying the signal gains of said first and second phase detection circuit during the NTSC and PAL signal reception, DC levels of the output signals of said first and second phase detection circuit being not varied and said amplitude ratios for each PAL and NTSC TV systems being maintained to respective given values.

In addition, there is a circuit arrangement for processing colour television signals according to the present invention comprising:

a first colour demodulation for demodulating a composite colour signal by a first colour subcarrier having a first phase with respect to a first demodulation axis;

a second colour demodulator for demodulating said composite colour signal by a second colour subcarrier having a second phase with respect to a second demodulation axis;

a matrix circuit for producing a colour demodulation signal having a third phase with respect to a third demodulating axis by vector-synthesizing the colour demodulation signals delivered from said first and second colour demodulators; and means for generating a correction vector signal so as to correct said third phase of the colour demodulation signal produced by said matrix circuit in such a manner that said correction vector signal is added to said colour demodulation signal of the matrix circuit so as to shift said third phase of the colour demodulation signal with respect to said third demodulation axis.

The present invention has an advantages in providing such a colour signal processing circuit that the subcarrier for the (R−Y) demodulation which was utilized in processing the NTSC system is used as the colour killer detection when processing the PAL system.

According to the invention there is also the advantage that a colour signal processing circuit provides such a PAL matrix circuit that two circuit networks for deriving (R−Y) and (B−Y) signal components are automatically changed in each TV system in the PAL matrix circuit so as to correct the amplitude ratios (B−Y)/(R−Y) to proper values.

According to the invention there is an advantage that when the outputs of the multi-mode PAL matrix circuit are adapted to both TV system having the proper amplitudes, the colour signal processing circuit may easily stabilize a variation of the DC input levels with respect to the demodulators by capacitors C801 and C802.

According to the invention, one advantage is to provide a colour signal processing circuit in which the demodulation signals of each colour signal may be demodulated with the proper levels, and which may prevent intensity variations of the picture screen when changing to a different TV system because of the stable DC level.

According to this invention it is possible to provide a colour signal processing circuit having a large number of commonly-used circuits.

According to the invention it is also possible to provide a colour signal processing circuit which can correct the phase shift of the demodulation axis, e.g., (G−Y) axis, which is obtained in the matrix circuit when changing between TV systems.

According to the invention, there is the advantage in the colour signal processing circuit that, since a power supply is interrupted by the ident and killer circuit so as to set both outputs of the flip-flop circuit at the lowest value during the NTSC signal reception, the base voltage of the transistor W754, into which the outputs of the flip-flop circuit are applied, is sufficiently lower than that of the transistor Q755, into which the output of the system switch cicuit is applied, so that changing the phase synthesizing circuit can be correctly performed.

The invention has a further advantage in providing a colour signal processing circuit in which the of the transistors gives no adverse influence to the phase synthesized vector in the phase synthesizing circuit.

BRIEF DESCRIPTION OF THE DRAWINGS

The invention is best understood by reference to the accompanying drawings, of which:

FIGS. 4b and 4c show vector diagrams explaining the operation of the demodulator of FIG. 4a;

FIGS. 6a and 6b show detailed circuit diagrams of the PAL matrix and system switch circuits shown in FIG. 5;

FIGS. 11a through 11d and 12a through 12c show vector diagrams explaining the operation of the PAL matrix circuit for PAL and NTSC TV signals respectively;

FIGS. 15b and 15c show equivalent circuits of the phase synthesizing circuit shown in FIG. 15a;

FIG. 15d shows a schematic diagram explaining the operation of th phase synthesizing circuit shown in FIG. 15a;

FIG. 16a shows a circuit diagram of the phase synthesizing circuit shown in FIG. 5;

FIGS. 16b and 16c show equivalent circuits of the phase synthesizing circuit shown in FIG. 16a;

FIG. 16d shows a schematic diagram explaining the operation of the phase synthesizing circuit shown in FIG. 16a; and FIG. 17 shows a schematic diagram explaining the operation of the ident/killer circuit shown in FIGS. 5 and 9.

DETAILED DESCRIPTION OF THE PREFERRED EMBODIMENT

Figure 5A:
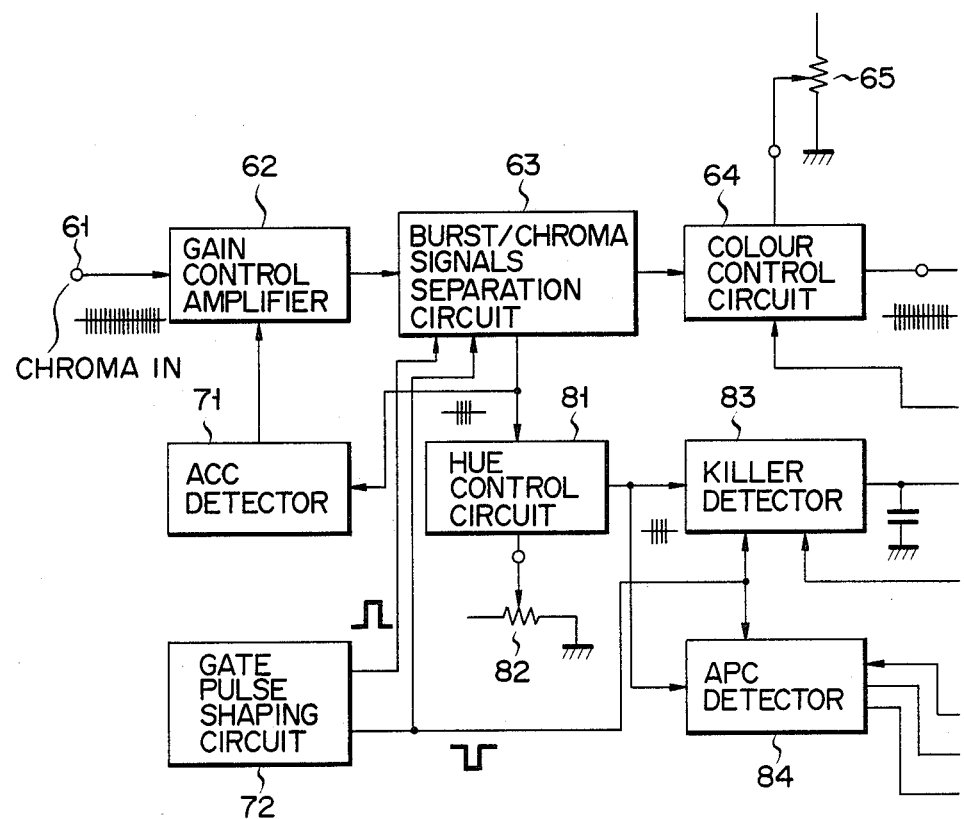
FIGS. 5a and 5b show block diagrams of an entire circuit for processing colour television signals of one preferred embodiment.
Figure 5B:
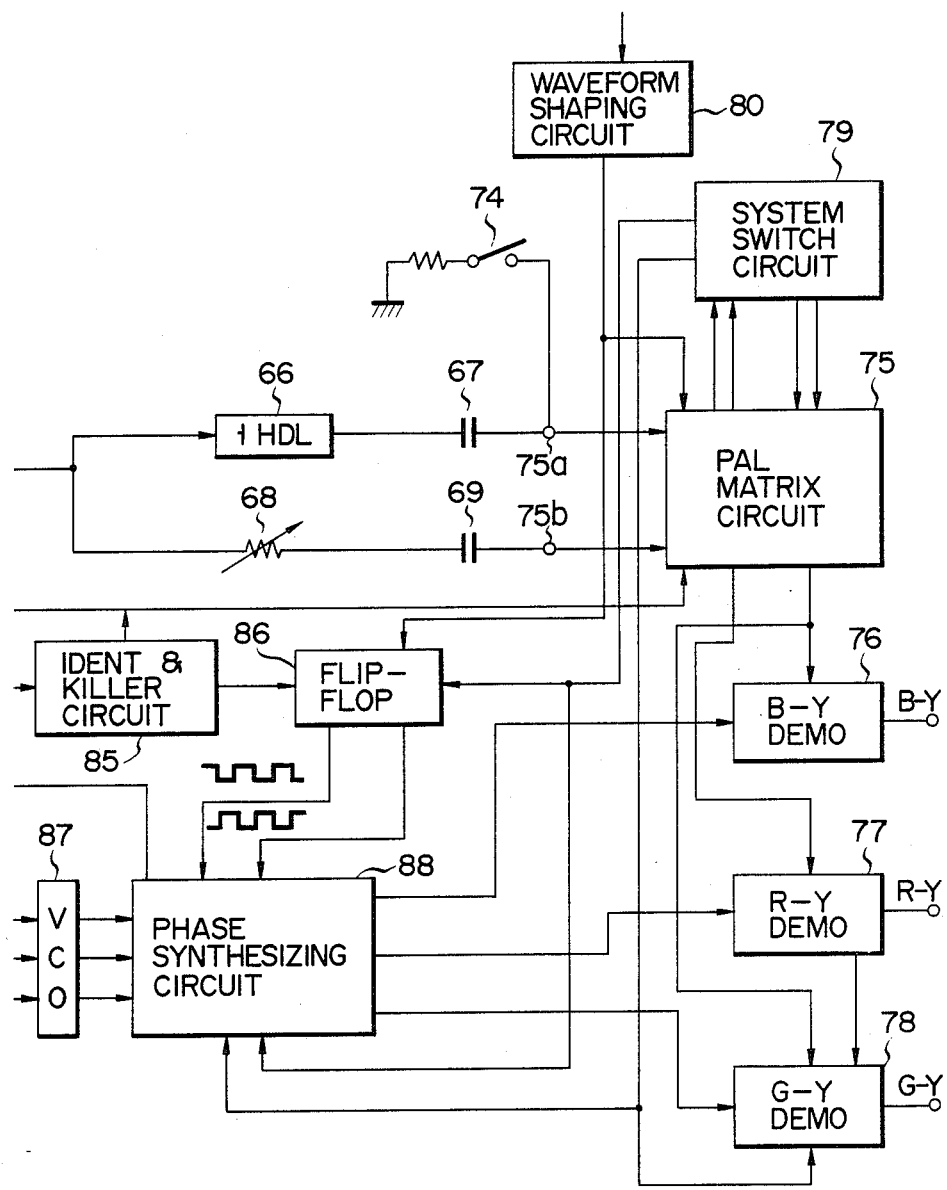

FIG. 5 shows a circuit diagram of an over-all circuit arrangement for processing colour television signals incorporated in a multi-mode colour television receiver according to the invention.

The numeral 61 indicates an input signal for a chroma signal containing a burst signal, and this input signal is supplied to a gain control amplifier 62. The chroma signal which has been gain-controlled in the gain control amplifier 62 is supplied to a burst/chroma signal separation circuit 63. The burst signal which has been separated in the burst/chroma signal separation circuit 63 is supplied to a hue control circuit 81, and the chroma signal is supplied to a colour control circuit 64. Furthermore the burst signal which has been separated in the burst/chroma signal separation circuit 63 is supplied to an automatic colour control detector (referred to as an "ACC detector") 71 so as to be detected in an amplitude mode. A DC voltage which is obtained by amplitude-detecting the burst signal is applied to a gain control terminal of the gain control amplifier 62. Accordingly, the chroma signal delivered from the gain control amplifier 62 is always controlled at a stable level. To separate the burst signal in the burst/chroma signal separation circuit 63, a gate pulse delivered from a gate pulse shaper 72 is employed. This gate pulse is synchronized with the burst signal during the burst signal period, and is therefore obtained in such a manner that, for example, the horizontal sync signal is delayed so as to adjust to have a constant pulse width.

The chroma signal separated in the burst/chroma signal separation circuit 63 is amplified in a colour control circuit 64. The gain of the colour control circuit 64 is controlled by adjusting a variable resistor 65 by the user. The chroma signal delivered from the colour control circuit 63 is supplied via a 1 H delay line 66 having a time delay defined by one horizontal sync period, and a coupling capacitor 67 to a delay input line 75a of a PAL matrix circuit 75, and is also supplied, via an attenuator 68 and a coupling capacitor 69 (which are connected in parallel), and via the above-mentioned 1 H delay line 66 and coupling capacitor 67, to an undelayed signal input line 75b of the PAL matrix circuit 75.

The detailed operation of the PAL matrix circuit 75 will be explained in FIG. 6. In the PAL matrix circuit 75, when the PAL colour television signal is processed in the entire system, the matix processing is effected for both a 1 H delayed chroma signal, which is delayed in the 1 H delay line, and an undelayed chroma signal. A (B−Y) signal component and an (R−Y) signal component are separated by this matrix processing, and are supplied to a (B−Y) demodulator 76 and an (R−Y) demodulator 77, respectively. On the other hand, when the NTSC television signal is processed in the entire system, an operation switch 74 is turned on so that the 1 H delayed chroma signal appearing at the delayed input line 75a is grounded. Consequently, only a delayed chroma signal is supplied to the PAL matrix circuit 75. The internal signal path of the PAL matrix circuit 75 is changed by turning on the operation switch 74, so that the output condition of a system switch 79 is also changed-over (the detailed construction of the system switch will be explained in FIG. 6). When the entire system of the first embodiment processes the NTSC television signal, the PAL matrix circuit 75 may separate the undelayed chroma signal into two transmission paths, of which separated signals are supplied to the (B−Y) demodulator 76 and the (R−Y) demodulator 77. A gate pulse of a waveform-shaping circuit 80 is also supplied to the PAL matrix circuit 75 and is synchronized with the horizontal sync signal. When this gate pulse is applied to the PAL matrix circuit 75, it may interrupt the chroma signal. The waveform-shaping circuit 80 may generate the above-mentioned gate pulse by using the flyback pulse in synchronism with, e.g., the horizontal sync signal. The gate pulse is also used to obtain a timing pulse for inverting a flip-flop circuit 88 (to be explained in detail hereinafter). The output signals from the PAL matrix circuit 75 are demodulated in the (B−Y) demodulator 76, the (R−Y) demodulator 77 and further the (G−Y) demodulator 78. The detailed description of those demodulators 76, 77 and 78 will be given with reference to FIG. 7.

The burst signal which has been phase-corrected in the hue control circuit 81 is supplied to a colour killer detector 83 (to be simply referred to "killer detector") and an automatic phase control detector 84 (to be simply referred to as an "APC detector"). In the killer detector 83, the phase detection is effected between the burst signal and the subcarrier for the killer detector, and a voltage in accordance with its phase difference as a killer detection voltage is delivered therefrom. On the other hand, in the APC detector 84, the phase detection is effected between the burst signal and the subcarrier for the automatic phase control, and a voltage in accordance with its phase detection is obtained as a control voltage for the oscillating frequency. The killer detector 83 and the APC detector 84 may perform the phase detection in synchronism with the burst signal. Its detection timing is determined by the gate pulse delivered from the gate pulse shaping circuit 72.

The killer voltage from the killer detector 83 is applied to an ident/killer circuit 85. The operation of the ident/killer circuit 85 will be described with reference to FIGS. 9 and 10. The ident/killer circuit 85 may control ON-OFF operation of the chroma signal transmission by the colour control circuit 64 in accordance with the level of the killer voltage, and also the inverting/-non-inverting operation of the flip-flop circuit 86. Furthermore the ident/killer circuit 85 may control ON-OFF operation of the chroma signal transmission path of the PAL matrix circuit 75 in accordance with its output. The ident/killer circuit 85 may discriminate between the colour TV signal reception and the monochrome TV signal reception based upon the level of the killer voltage, and furthermore, when the PAL colour television signal is received, it may discriminate whether the inverting/non-inverting operation of the flip-flop circuit 86 is effected under the correct phase or the incorrect phase. The timing of the inverting/non-inverting operation of the flip-flop circuit 86 may be determined by the gate pulse delivered from the waveform shaping circuit 80, and is operation is effected for every horizontal sync period. The flip-flop circuit 86 may be brought into the operating condition or the non-operating condition by a changing signal from the system switch circuit 79. When the NTSC TV signal is processed, the operation of the flip-flop circuit 86 is interrupted, and it is commenced whtn the PAL TV signal is processed.

A reference oscillation output delivered from a voltage-controlled oscillator 87 is supplied to a phase synthesizing circuit 88. From this phase synthesizing circuit 88, for example, for subcarriers are delivered in accordance with various purposes. The phase synthesizing circuit 88 may produce a subcarrier for (B−Y) demodulation which is to be added to the (B−Y) demodulator 76, a subcarrier for (R−Y) demodulation which is to be added to the (R−Y) demodulator 77, a subcarrier for (G−Y) demodulation which is to be added to the (G−Y) demodulator 78, and a subcarrier for killer detection which is to be added to the killer detector 83. The subcarrier for the last-mentioned correction is utilized in the (G−Y) demodulator (78) when the NTSC television signal is undergoing the process. The operation mode of the phase synthesizing circuit 88 may be changed by the output of the system switch circuit 79. When the PAL or the NTSC TV signals are processed, the phase condition of the (R−Y) demodulation subcarrier is changed-over. Also, the phase of this subcarrier is inverted every horizontal period by the output of the flip-flop circuit 86. Into the phase synthesizing circuit 88, two referece oscillation outputs having different phases are supplied from the voltage-controlled oscillator 87 so as to produce various subcarriers, as previously described. The oscillation frequency of the voltage-controlled oscillator 87 may be controlled by the detection output from the APC detector 84, so that it is always controlled in order to obtain the oscillation output which is in synchronism with the burst signal.

(1) PAL Matrix Circuit

FIG. 6 shows in detail the PAL matrix circuit 75, the system switch circuit 79 and the operation switch circuit 79 and the operation switch 74. The PAL matrix circuit 75 may function as a matrix circuit for vector adding and subtracting between the undelayed chroma signal and the delayed chroma signal when the PAL TV signal is processed, and may function as separation transmission path of the undelayed chroma signal. The operation switch 74 turns on at the NTSC signal reception, and turns off at the PAL signal reception. A negative-going horizontal blanking pulse (a gate pulse) from the waveform shaping circuit 80 is applied to a base of a transistor Q839. The transistor Q839 may be turned off by this horizontal blanking pulse. The PAL matrix circuit 75 may function to of interrupt the transmission paths for the chroma signal when a transistor Q840 is turned on by the color killer signal, even if the transistor Q839 which blocks the input signal during the horizontal blanking period (to remove the burst signal) is turned on.

(1) - 1 Receiving the PAL TV Signal

Upon receipt of the PAL TV signal, the operation switch 74 turns off, which causes transistors Q817 and Q818 to be turned on. As a result, the collector voltages of the transistor Q817 and Q818 may drop. A voltage lower than the collector voltage of the transistor Q181 by VF (a voltage drop on the diode connection) may appear at an emitter of the transistor Q842, which is applied to the bases of transistors Q889, Q822 and Q821. Consequently, the transistors Q889, Q822 and Q821 may turn off (the transistors Q822 and Q821 may function to transmit the (R−Y) and (B−Y) chroma signals when receiving the NTSC TV signal, and may turn off when receiving the PAL TV signal).

(1) - 2 Vector Adding in PAL Matrix Circuit

The undelayed chroma signal is supplied to a base of the transistor Q810. Then the undelayed chroma signal supplied to this transistors Q810 is conducted to a resistor R823 via a path comprising a collector of the transistor Q810, a resistor R875, a transistor Q820, and a resistor R823. In this case, the phase of the undelayed chroma signal is inverted by the transistor Q820.

The undelayed chroma signal which is supplied to the base of the transistor Q810 is, on the other hand, conducted to a resistor R826 via an emitter of the transistor Q810, a resistor R816, a resistor R817, a transistor Q813, a resistor R876, a transistor Q823, and a resistor R882.

The delayed chroma signal is supplied to bases of transistors Q818 and Q817. Thereafter this delayed chroma signal is conducted to a collector of a transistor Q824 via an emitter of a transistor Q817, a resistor R819, a resistor R818, a transistor Q814, a resistor R877, and the transistor Q824. It is also conducted to a resistor R823 via an emitter of the transistor Q817, a resistor R819, a resistor R818, a transistor Q814, a resistor R878, and a transistor Q825. As a result, the undelayed chroma signal is added to the inverted delayed chroma signal at a junction point between the collector of the transistor Q824 and the resistor R823. In other words, the vector subtraction is effected between the undelayed chroma signal and the delayed chroma signal. The undelayed chroma signal is vector-added to the delayed chroma signal at a junction point between the resistor R826 and the resistor R883 connected to the collector of the transistor Q825. The (B−Y) component obtained by the vector addition is applied to a base of a transistor Q827 and the (R−Y) component obtained by the vector subtraction is applied to a base of a transistor Q826.

(1) - 3 Receiving the NTSC TV Signal

When the NTSC TV signal is received, the PAL matrix circuit 75 may amplify and separate the undelayed chroma signal. At this time the operation switch 74 turns on. As a result, the base potential of the transistors Q818 and Q817 constructing the system switch circuit 79 becomes low, so that the transistors Q818, Q883 and Q817 turn off. Among the transistors Q818, Q883, Q884 and Q819 constructing the system switch circuit 79, the collector potential of the transistor Q818 becomes high, and that of the transistor Q819 becomes low. Since the collector potential of the transistor Q818 becomes high, the emitter potential of the transistor Q824 becomes high. This high emitter voltage is applied to the bases of the transistors Q889, Q822 and Q821. Accordingly, the transistors Q889, Q822 and Q821 change from the OFF state to the ON state. Since the collector potential of the transistors Q819 becomes low, the emitter potential of the transistor Q841 becomes low. This low emitter voltage is applied to the bases of the transistors Q823, Q824 and Q825, and the base of the transistors Q820. Thus, those transitors turn off. As a result, when receiving the NTSC TV signal, the transistors Q825 and Q824 which form the transmission path for the delayed chroma signal are turned off, so that the delayed chroma signal is interrupted. Consequently, when receiving the NTSC TV signal, the delayed chroma signal is, on the one hand, supplied to the base of the transistors Q826 via a signal path of the base-collector of the transistor Q810, the resistor R875, the transistor Q821, the resistor R880, and on the other hand, supplied to the base of the transistor Q827 via a signal path of the base-emitter of the transistor Q810, the resistor R816, the resistor R817, the transistor Q813, the resistor R876, the transistor Q822, and the resistor R881.

The signal supplied to the base of the transistor Q827 is supplied to the (B−Y) demodulator 87 of the next stage via the emitter of the transistor Q827, a capacitor C802 for blocking a DC component, and a base-emitter path of a transistor Q832. The signal supplied to the base of the transistor Q826 is supplied to the (R−Y) demodulator 77 of the next stage via the emitter of the transistor Q826, a capacitor C801 for blocking a DC component, and a base-emitter path of a transistor Q831.

(1) - 4 Automatic Gain Control Operation in PAL Matrix Circuit

The gain of the PAL matrix circuit 75 is automatically changed when receiving the PAL TV signal and the NTSC TV signal. Nevertheless, the DC output voltages of the matrix circuit 75 are kept constant even if the reception signal mode is changed. In other words, when receiving the PAL TV signal, the vector addition between the undelayed chroma signal and the delayed chroma signal is effected at the collector side of the transistsor Q825, and the vector subtraction between the above-mentioned signals is done at the collector side of the transistor Q824. The aim of the vector addition is to derive the (B−Y) component, where the resistor R825 may function as a load for the transistor Q823 which amplifies the undelayed chroma signal, and the summed registers (R825+R826) may function as a load for the transistor Q825 which amplifies the delayed chroma signal. In constrast to the above operation, the aim of the vector subtraction is to derive the (R−Y) component, where the resistor R822 may function as a load for the transistor Q820 which inverts the undelayed chroma signal, and the summed resistors (R822+R823) may function as a load for the transistor Q824 which amplifies the delayed chroma signal.

When receiving the NTSC TV signal, the transistor Q822 has a load of the resistors R825 and R826, and the transistor Q821 has a load of the resistors R822, R823 and R829.

As previously described, in accordance with the reception of the PAL and NTSC TV signals, the loads in the PAL matrix circuit can be selected for the (B−Y)

component and the (R−Y) component. By selecting the loads in the proper values it is possible for the relative amplitude ratio (B−Y)/(R−Y) to set "1" in the case of the PAL TV signal and "0.56" in the case of the NTSC TV signal with no variation of the DC output potentials. Namely, it is possible to automatically select the proper amplitude ratio for each TV signal.

(1) - 5 Vector Relationships Between (R−Y) and (B−Y) Components.

As already explained, when receiving the PAL and the NTSC TV signals, the PAL matrix circuit 75 may function to change the amplitude ratio between (B−Y) and (R−Y) components. More details of this amplitude ratio will now be explained where α and β denote the undelayed chroma signal and the delayed chroma signal, respectively.

FIG. 11a shows vector diagrams of the undelayed chroma signal when receiving the PAL TV signal, and FIG. 11b shows vector diagrams of the delayed chroma signal when receiving the PAL TV signal. As shown in FIG. 11c, the (B−Y) component and its amplitude is denoted as α (R825)+β (R825), where "R825" is equal to the resistance value of the resistor R825 shown in FIG. 6. The (R−Y) signal component is then conducted every 1 horizontal line period as −2(R−Y) or 2(R−Y) as shown in FIG. 11d. The amplitude of this component is indicated as (R822)−(R822), where "R822" is equal to the resistance value of the resistor R822 shown in FIG. 6.

When the entire signal processing system is changed to the NTSC processing mode, only the undelayed chroma signal is processed as shown in FIG. 12a. The chroma signal which is to be supplied to the (B−Y) demodulator is conducted as the vector synthesized between the 2(R−Y) signal component and the 2(B−Y) signal component. The amplitude of this chroma signal is indicated as (R825+R826), where "R825" and "R826" are equal to the resistance values of the resistors R825 and R826 respectively shown in FIG. 6. On the other hand, the chroma signal which is to be supplied to the (R−Y) demodulator is conducted as the vector synthesized between the 3.56(B−Y) signal component and the 3.56(R−Y) signal component. The amplitude of this chroma signal is indicated as −(R822+R823+R829), where "R822", "R823", and "R829" are indentical to the resistors R822, R823 and R829, respectively, shown in FIG. 6.

(1) - 6 Other Embodiments of PAL Matrix Circuit

Figure 13A:
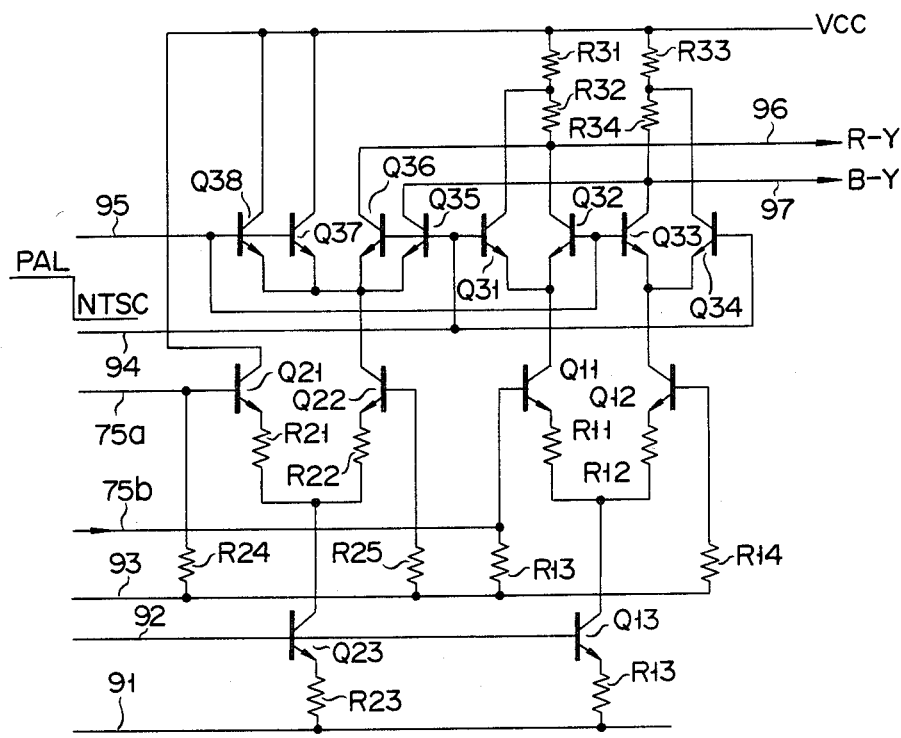
FIGS. 13a and 13b show circuit diagrams of the PAL matrix circuit of other preferred embodiments.
Figure 13B:
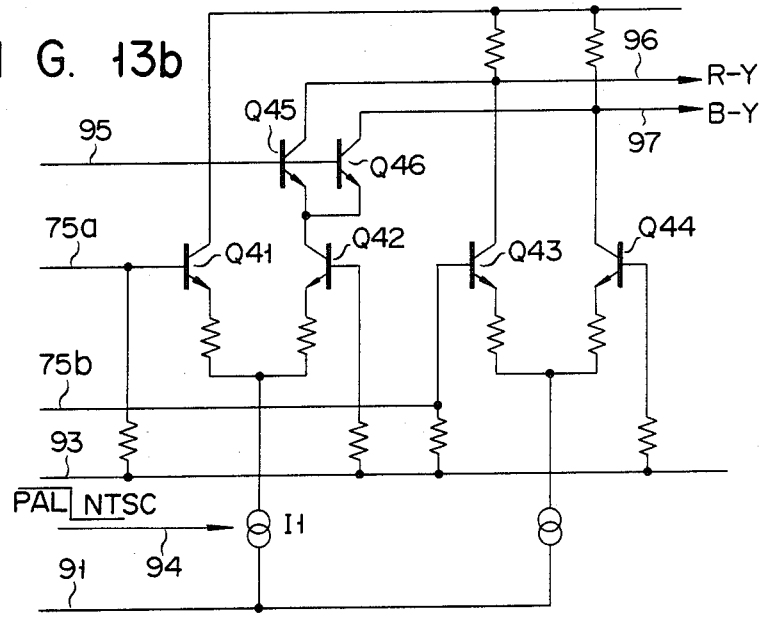

FIGS. 13a, 13b show circuit diagrams of other embodiments of the PAL matrix circuit 75.

In the second embodiment as shown in FIG. 13a, the numeral 91 indicates a reference groud potential line, the numeral 92 denotes a biasing line for setting a constant current, the numeral 93 is a base biasing line, the numeral 75b indicates an input line for the undelayed chroma signal and the numeral 75a denotes an input line for the delayed chroma signal. Furthermore, the numeral 94 indicates an input line for a changing signal which is delivered from the system switch circuit, and the numeral 95 is a line to which a reference voltage is applied.

When receiving the NTSC TV signal, a potential of the input line for the changing signal 94 goes to a low level. As a result, the transistors Q31, Q35, Q36 and Q34 turn off. Accordingly, the undelayed chroma signal is introduced to the output line for the (R−Y) signal component 96 via a signal path of the base-collector of the transistor Q11 and the emitter-collector of the transistor Q32. It is also introduced to the output line for the (B−Y) signal component via the base-emitter of the transistor Q11, the resistor R11, the resistor R12, the emitter-collector of the transistor Q12, and the emitter-collector of the transistor Q33.

When receiving the PAL TV signal, a potential of the input line for the changing signal 94 goes to a high level. Thus the transistors Q35, Q36, and Q34 turn on and the transistors Q31 and Q33 turn off. Consequently, the undelayed chroma signal is conducted to the output line for the (R−Y) signal component via the transistor Q11, the transistor Q31, and the resistor R32, and also to the output line for the (B−Y) signal component 97 via the transistor Q11, the resistor R11, the resistor R12, the transistor Q12, the transistor Q34 and the resistor R34. On the other hand, the delayed chroma signal is distributed into the transistors Q36 and Q35 via a signal path of the transistor Q21, the resistor R21, the resistor R22, and the transistor Q22. Thereafter the distributed chroma signals are conducted to the output line for the (R−Y) component 96 and the output line for the (B−Y) component 97. Consequently the PAL TV signal may be processed in the matrix circuit.

If the signal is indicated as F(p)n which is supplied to the transistor Q21 and the signal supplied to the transistor Q11 is indicated as F'(p)n+1, the signal which appears at the output line 97(B−Y) is expressed:

$$F(p)'n + F(p)n + 1 = \{\alpha'(B - Y) \pm j\beta(R - Y)\} + \{\alpha'(B - Y) \mp j\beta'(R - Y)\} = 2\alpha'(R - Y)$$

Similarly, the signal which appears at the output line 96(R−Y) is expressed:

$$F'(p)n - F'(p)n + 1 = \pm j2\beta(R - Y)$$

Explanation will now be given to the PAL matrix circuit shown in FIG. 13b. It should be noted that the same reference numerals shown in FIG. 13a will be employed to denote the same circuit elements shown in FIG. 13b. According to the circuit of FIG. 13b, a current source I1 for transistors Q41 and Q42 which may receive and amplify the delayed chroma signal is controlled to be turned on or off in response to the NTSC TV signal or the PAL TV signal.

When processing the NTSC TV signal, since the current source I1 is turned off, only the undelayed chroma signal is conducted to the collector side of the transistor Q43 and the collector side of the transistor Q44. When processing the NTSC TV signal, as the current source I1 is turned on, the delayed chroma signal is conducted through a signal path of the transistors Q41 and Q42, and is then distributed by the transistors Q45 and Q46 so as to be matrix-processed.

(2) (B−Y), (R−Y) and (G−Y) Demodulators, and Phase Synthesizing Circuit

Figure 7:
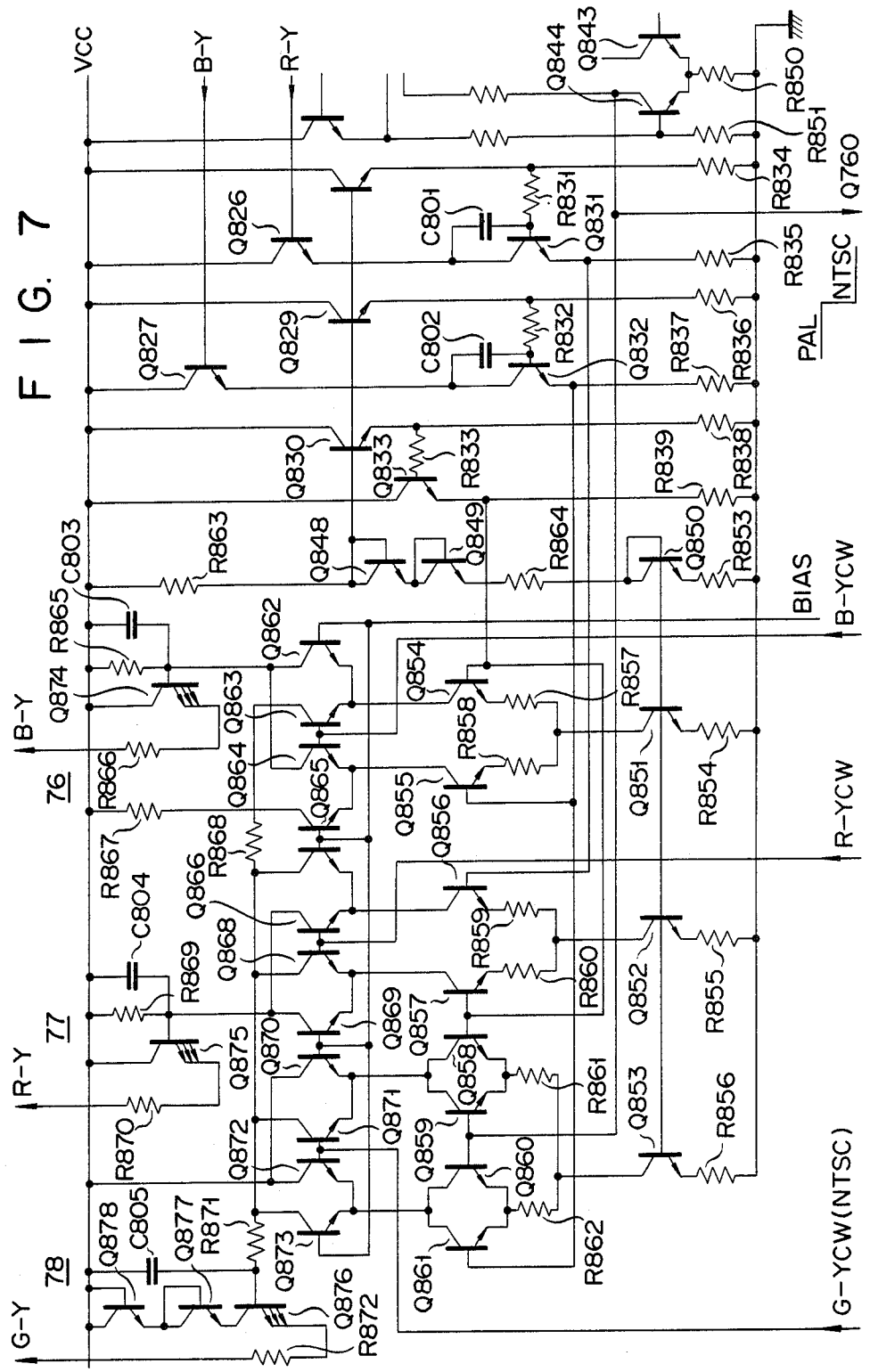
FIG. 7 shows a detailed circuit diagram of the demodulator shown in FIG. 5.
Figure 8A:
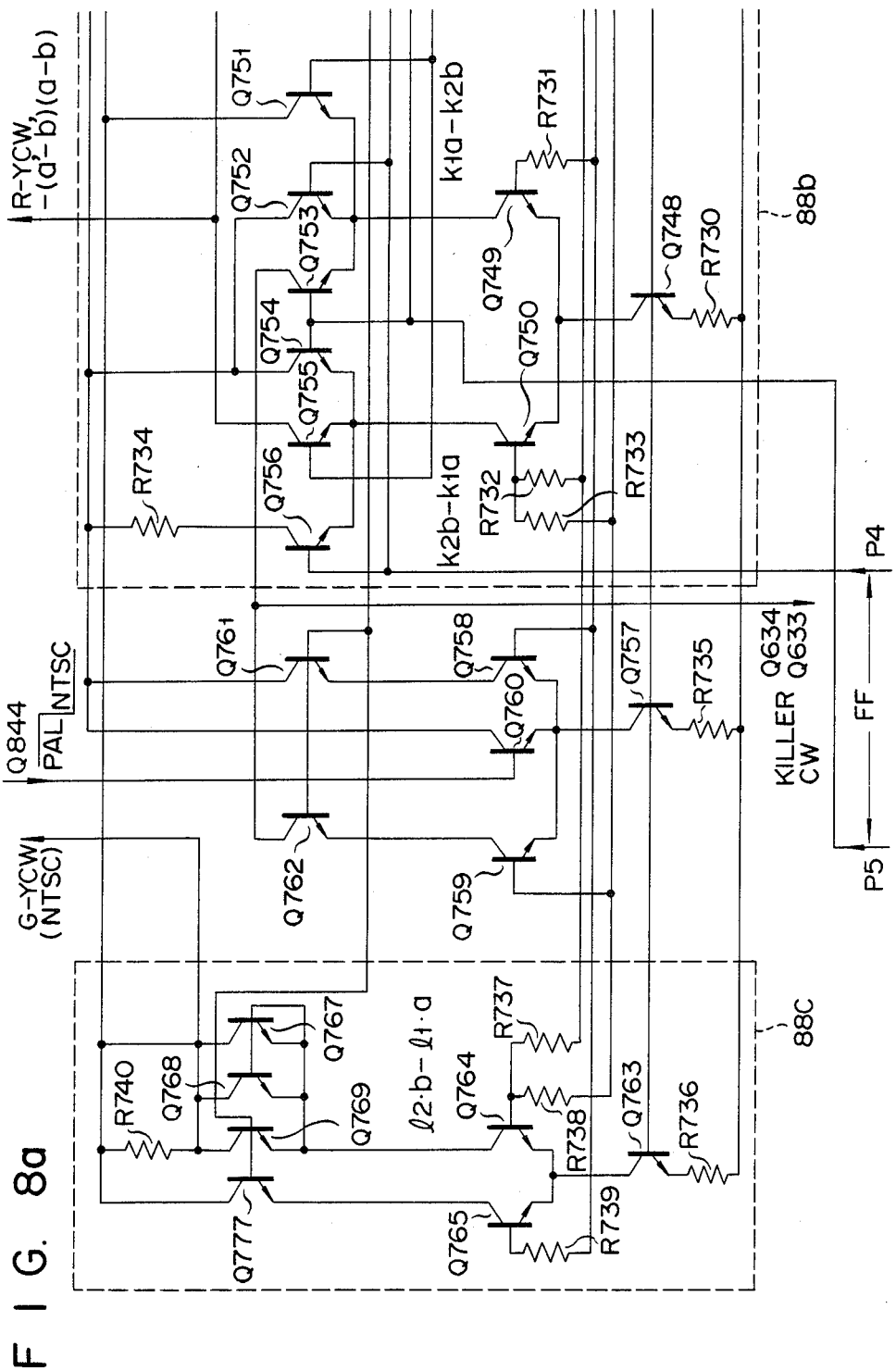
FIGS. 8a and 8b show detailed circuit diagrams of the phase synthesizing circuit shown in FIG. 5.
Figure 8B:
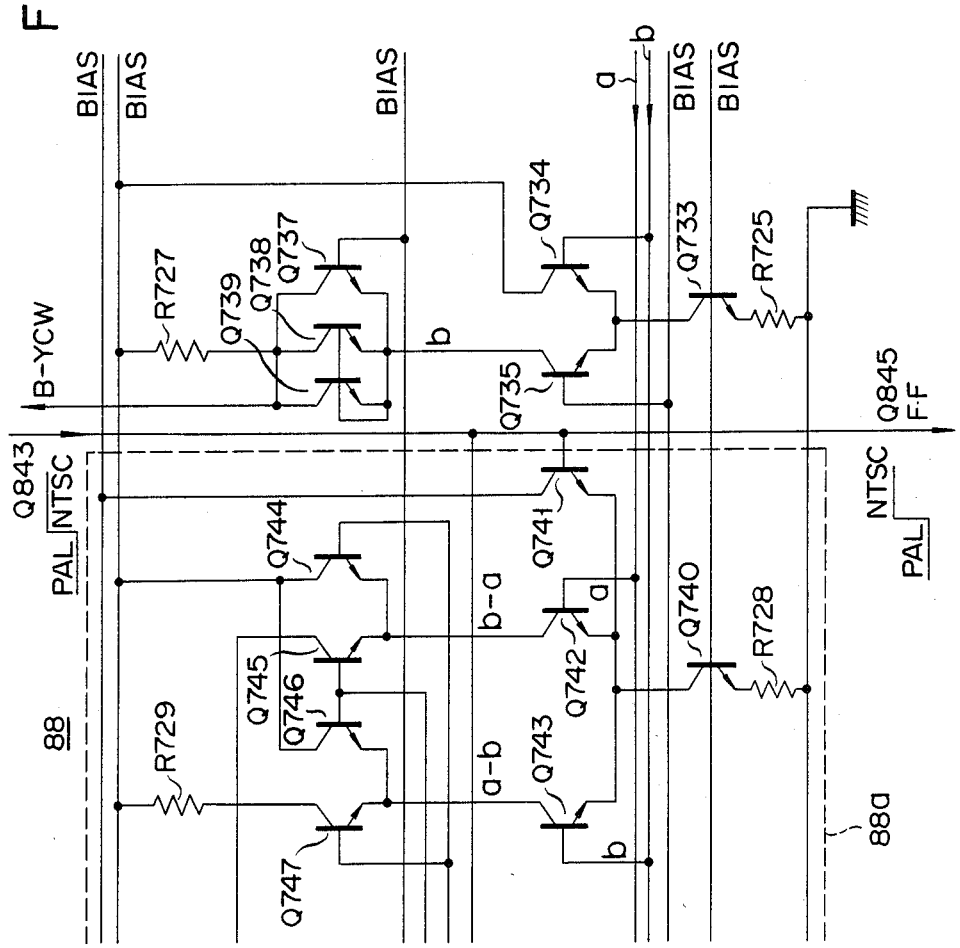

FIG. 7 shows a circuit diagram of the (B−Y), (R−Y) and (G−Y) demodulators 76, 77 and 78. FIG. 8 shows a circuit diagram of the phase synthesizing circuit 88.

(2) - 1 (B−Y), (R−Y) and (G−Y) Demodulators
(reception of the PAL TV signal)

The (B−Y) signal component which has been derived from the emitter of the transistor Q832 (in FIG. 6)

is supplied to bases of transistors Q855 and Q861 respectively. The (R−Y) signal component which has been derived from the emitter of the transistor Q831 is supplied to a base of a transistor Q856. In the (B−Y) demodulator 76, the transistors Q854, Q855, Q862, Q863, Q864 and Q865 constitute a multiplier circuit. A subcarrier for (B−Y) demodulation (referred to as "B−YCW") delivered from the phase synthesizing circuit 88 is applied to a common base of the transistors Q864 and Q863. The demodulation signal (B−Y) of the (B−Y) signal component is derived via a common collector of the transistors Q862 and Q864 through a signal path of the base-emitter of the transistor Q874 and the resistor Q866. On the other hand, the modulation signal having a reverse polarity [−(B−Y)] is derived from a common collector of the transistors Q863 and Q865 to a resistor R868 for the matrix processing.

In the (R−Y) demodulator 77, the transistors Q856, Q857, Q866, Q867, Q868 and Q869 constitute a multiplier circuit. A subcarrier for (R−Y) demodulation (R−YCW) delivered from the phase synthesizing circuit 88 is applied to a common base of the transistors Q867 and Q868. The modulation signal (R−Y) of the (R−Y) signal component is derived from a signal path of a common collector of the transistors Q867 and Q869, a base-emitter of the transistor Q875 and a resistor R870. The demodulation signal (R−Y) having a negative polarity [−(R−Y)] is derived from a common collector of the transistors Q866 and Q868 to a resistor R871 for the matrix processing. Accordingly, the demodulation signal (G−Y) obtained by matrix-processing the demodulation signals (B−Y) and (R−Y) may be derived through a signal path of the base-emitter of the transistor Q876 and the resistor R872. There is a 180°-phase-difference between the demodulation signal obtained at the transistor Q869 and the demodulation signal obtained at the collector of the transistor Q866 having a load of the resistor R868. There is also a phase difference of 180° between the demodulation signal obtained at the collector resistor R867 of the transistor Q865 and the demodulation signal obtained at the collector of the transistor Q862. That is, the above-mentioned demodulation signal (G−Y) is intended to be obtained by vector-synthesizing the demodulation signals −(B−Y) and −(R−Y).

(2) - 2 (B−Y), (R−Y) and (G−Y) Demodulators and Phase Synthesizing Circuit (reception of NTSC TV signal)

The operation of the (B−Y) demodulator 76 and the (R−Y) demodulator 77 when receiving the NTSC TV signal is identical to that when receiving the PAL TV signal. However, in response to the system switch circuit 79 when receiving the NTSC TV signal the collector potential of the transistor Q844 becomes low and that of the transistor Q843 becomes high. When the collector potential of the transistor Q844 becomes low, the transistors Q859 and Q860 constituting the (G−Y) demodulator 78 turn off. Concurrently, the transistors Q861 and Q858 turn on, so that the chroma signal derived from the matrix circuit 75 is conducted to the collector of the transistor Q861 via the emitter thereof. At this time, the transitors Q858, Q861, Q870, Q871, Q872 and Q873 may function as a multiplier circuit, and a correction demodulating signal (G2−Y) i.e, a multiplied output signal between the subcarrier for (G−Y) demodulation (referred to as "G−YCW") and the (B−Y) component may be obtained at a common collector of the transistors Q873 and Q871, the above-mentioned subcarrier being equal to, practically one for correcting the vector phase of the (G−Y) axis. Consequently, when receiving the NTSC TV signal, the matrix processing may be performed for the demodulation signals (B−Y), (R−Y) and the correcting demodulation signal (G2−Y) so that the resultant signal may be finally conducted as a formal demodulation signal (G−Y).

(3) Phase Synthesizing Circuit and Demodulation Axes

FIG. 8 shows a circuit diagram of the phase synthesizing circuit 88. Correlation between the demodulation axes of the above-mentioned (B−Y), (R−Y) and (G−Y) demodulators 76, 77, 78 and the phase synthesizing circuit 88 wil now be explained with reference to FIGS. 7 and 8.

(3) - 1 Demodulation Axes of PAL TV Signals

A subcarrier necessary for the colour demodulation is generated in this phase synthesizing circuit 88 based upon the burst signal as a reference signal, which is obtained in the automatic phase control loop (APC loop). A subcarrier for the (B−Y) demodulation (B−YCW) with respect to the (B−Y) axis may be produced by utilizing a second reference oscillating signal (b) which is applied to the base of the transistor Q734 constructing the phase synthesizing circuit 88. This second reference oscillating signal (b) is one that is obtained by delaying a first reference oscillating signal (a). This first reference oscillating signal (a) is one that is generated in the APC loop including the control voltage oscillator 87 so as to be in synchronism with the phase of the burst signal. When the second refernece oscillating signal (b) is applied to the base of the transistor Q734, a signal (b) appears at the collector of the transistor Q735 whose phase is in phase with that of the second reference oscillating signal (b). This new signal (b) may be conducted via the transistor Q739 as the subcarrier (referred to as "B−YCW") for the (B−Y) demodulation. Then this subcarrier is intended to be applied to a common base of the transistors Q863 and Q864 shown in FIG. 7.

Another subcarrier (R−YCW) for the (R−Y) demodulation is generated in a first phase synthesizing circuit 88a. The first phase synthesizing circuit 88a comprises transistors Q742, Q743, Q744, Q745, Q746 and Q747. To the base of the transistor Q742, the first reference oscillating signal (a) is supplied, and to the base of the transistor Q743 the second reference oscillating signal (a) is supplied, and to the base of the transistor Q743, the second reference oscillating signal (b) is supplied. Those transistors Q742 and Q743 may construct a differential amplifier, a common emitter of which is connected to a collector of a transistor Q740 which constitutes a current source. Under these circuit arrangement, one signal [−(a−b)=b−a] appears at the collector of the transistor Q742 and another signal (a−b) appears at the collector of the transistor Q743. Then the first-mentioned signal (b−a) may be conducted to the collector of the transistor Q745, and the second-mentioned signal (a−b) to a resistor R729 which is connected as a load to the collector of the transistor Q747. So, which signal (b−a) or (a−b) is delivered may be determined by the output signal state of the flip-flop circuit 86, which is applied to the common base of the transistors Q745 and Q746. In other words, the flip-flop circuit 86 delivers an inverting output (P4) and non-inverting output (P5). If the inverting output (P4) becomes high level, the first-mentioned signal {−(a−b)=b−a} is derived to the resistor R729 through the transistor 745. If it becomes low level, the second-mentioned signal (a−b) is derived to the resistor (729) through the transistor 747. As previously explained in FIG. 5, since the output state of the flipflop circuit 46 changes every one horizontal sync period, two sorts of signals (b−a) and (a−b) are alternately delivered in case of the PAL signal reception. That is, the phase of the subcarrier (R−YCW) for the (R−Y) demodulation is inverted in every 1 line period to demodulate the (R−Y) signal component. Then the subcarrier (R−YCW) is supplied to bases of transistors Q867 and Q868 shown in FIG. 7. When receiving the PAL TV signals, there is 90° phase difference between the (B−Y) axis and the (R−Y) axis of the two subcarriers. In this case, the base potential of the transistor Q818 in the system switch circuit 79 becomes high and its collector potential becomes low. Further the emitter potential of the transistor Q842 becomes low, so that the collector potentials of the transistors Q844 and Q843 become high.

The collector potential of the transistor Q843 of the system switch circuit 79 is also applied to the bases of the transistors Q751 and Q755. Accordingly, when receiving the PAL TV signal, since the base potentials of the transistors Q751 and Q755 in the phase synthesizing circuit 88 are kept low, they are turned off. As a result, because the collector of the transistor Q755 is electrically isolated from the resistor R729, only the above-mentioned signals (a−b) and (b−a) are derived as the subcarrier.

Figure 1:
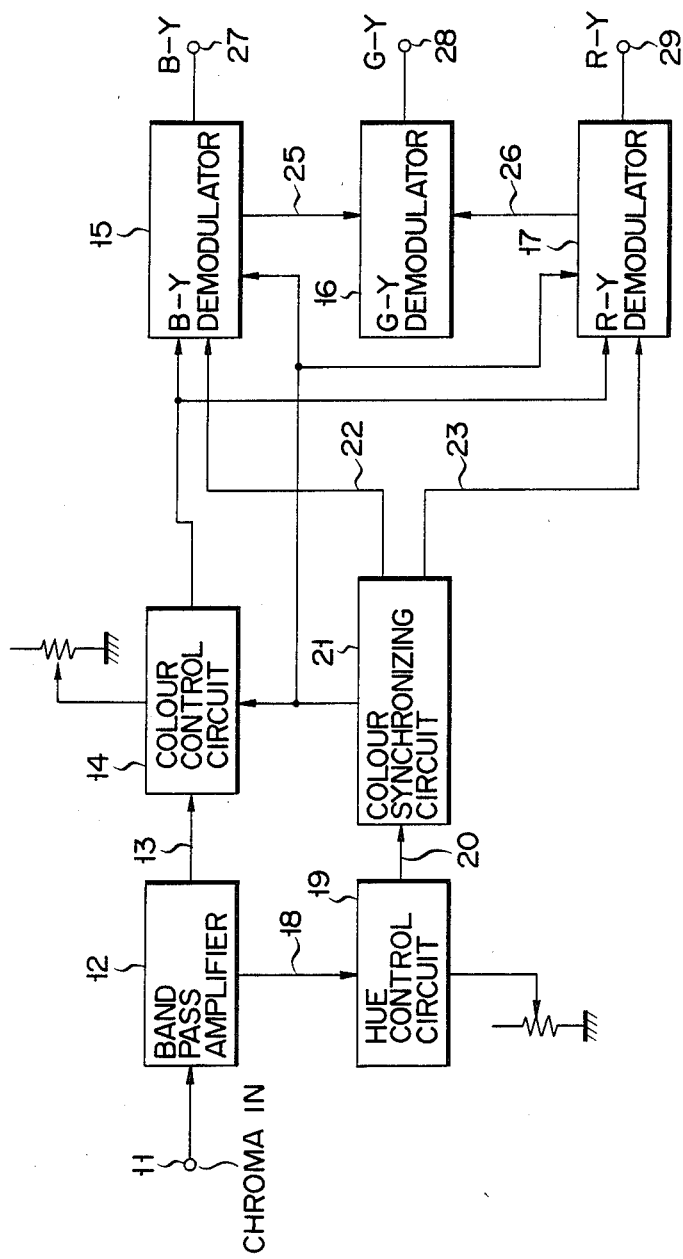
FIG. 1 shows a block diagram of a conventional colour signal processing circuit for an NTSC system.
Figure 2:
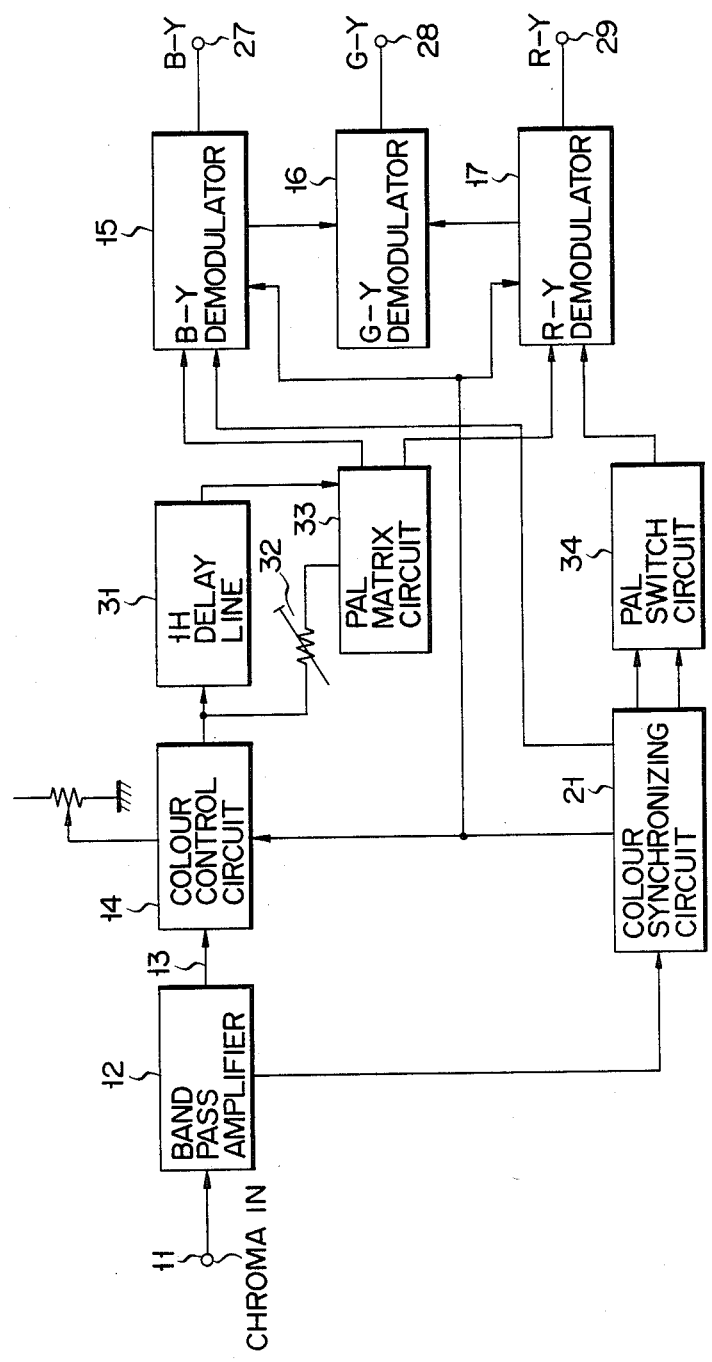
FIG. 2 shows a block diagram of a conventional colour signal processing circuit for a PAL system.
Figure 3:
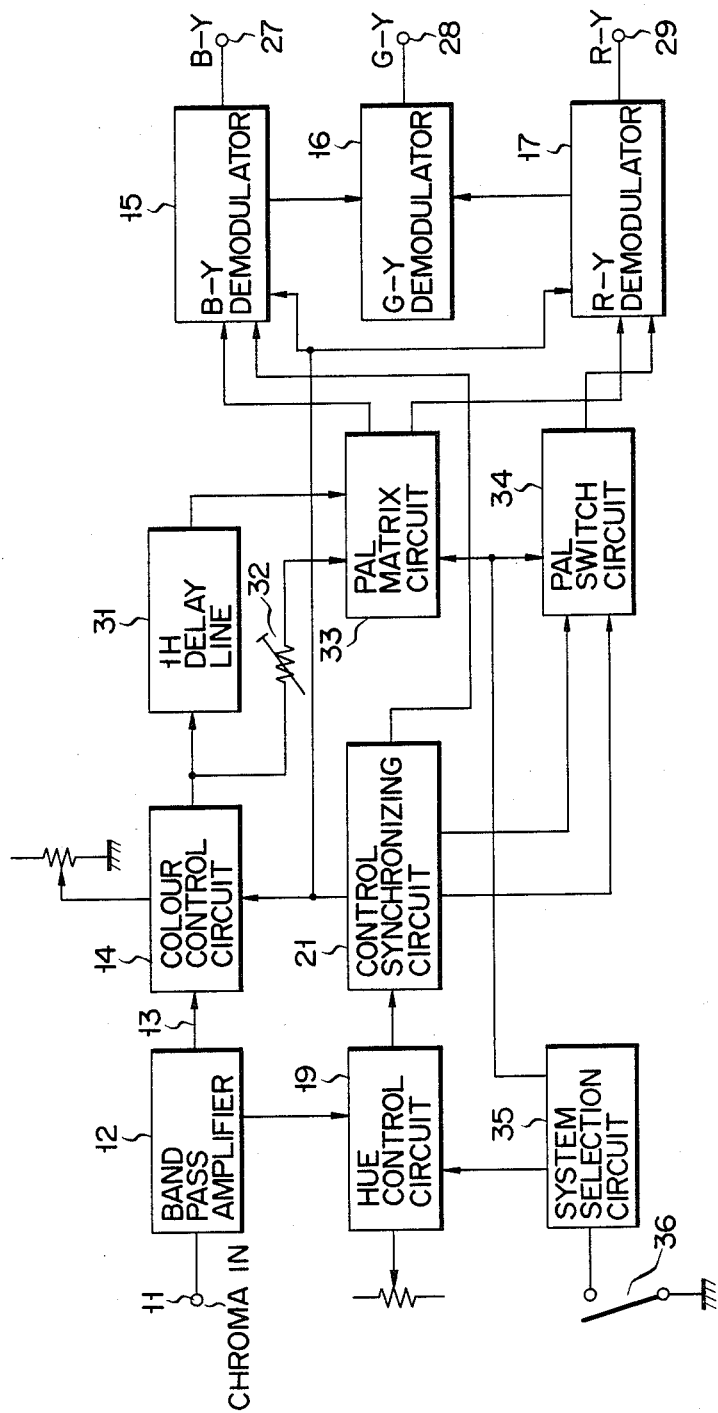
FIG. 3 shows a block diagram of a conventional colour signal processing circuit for both the NTSC and PAL systems.
Figure 4A:
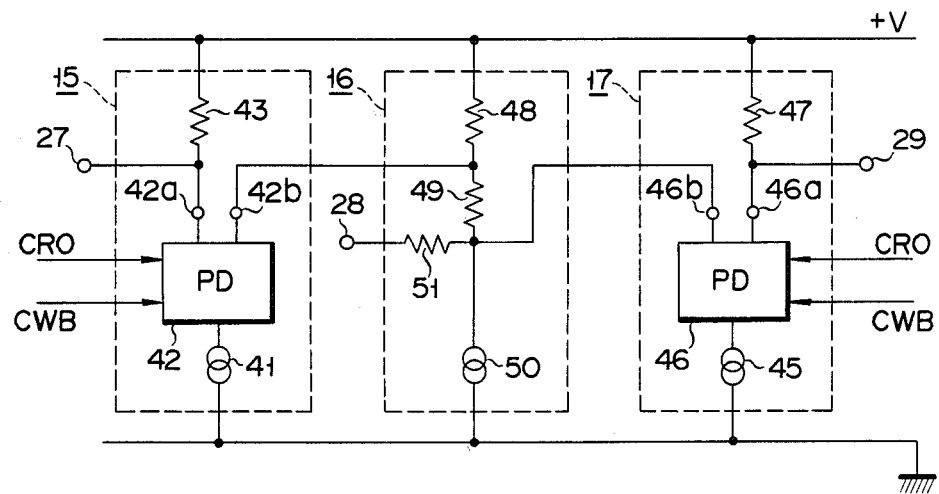
FIG. 4a shows a circuit diagram of a colour demodulator shown in FIG. 3.
Figure 4B:
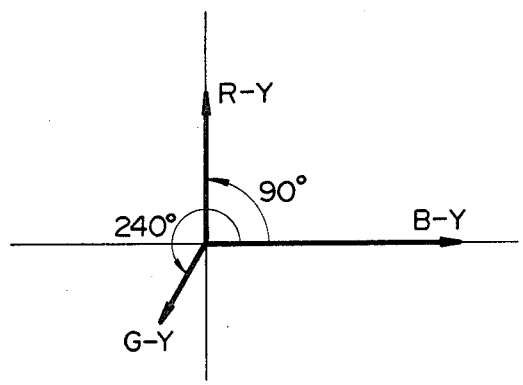
Figure 4C:
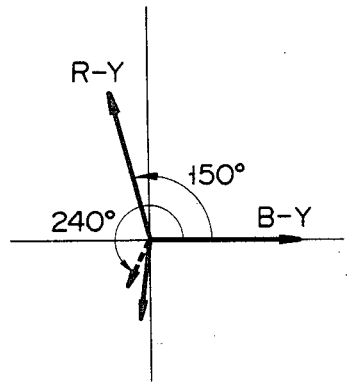

The (G−Y) axis in case of the PAL signal reception will now be explained. When receiving the PAL TV signals, in accordance with the conditions of the transistors Q818, Q819, Q841, Q842, Q843 and Q844 which constitute the system switch circuit 79, the transistors Q861 and Q858 of the (G−Y) demodulator shown in FIG. 7 are turned off. Consequently the chroma signal (B−Y signal component) obtained through the emitter of the transistor Q832 is cut off at the transistor Q861. Concurrently, in the (G−Y) demodulator, there is no multiplication between the subcarrier (G−YCW) for the (G−Y) demodulation and the (B−Y) signal component. However in this case a given DC voltage appears at the collector of the transistor Q873. In case of the PAL signal reception, as already explained in FIG. 4b, the (G−Y) demodulation signal may be obtained by matrixing the {−(B−Y)} demodulation signal and the {−(R−Y)} demodulation signal. On the other hand, in the phase synthesizing circuit 88, although the signals (a) and (b) are supplied to the bases of the transistors Q764 and Q765 and the synthesized signal as the subcarrier (G−YCW) for the (G−Y) demodulation, the last-mentioned signal may have no influence on the demodulation operation, but may be bypassed through the capacitor C805 in FIG. 7.

(3) - 2 Demodulation Axis of NTSC TV Signals

For receiving the NTSC TV signals, a PAL matrix circuit 75 which has been used for reception of PAL signals is commonly used. It functions both as a transmission path and a separating path for the chroma signal. When receiving the NTSC TV signals the operation of the flip-flop circuit 86 is interrupted by means of the system switch circuit 79. In this signal mode, the demodulation phases of the demodulation axes are different from those of the PAL signal reception. Namely, the relative phase difference between the (B−Y) axis and (R−Y) axis is set at approximately 105° as previously described. As to the relative amplitude ratio between the demodulation signals, a difference exists in the NTSC and the PAL TV systems. The reason is that there is a difference in setting a white colour temperature for the both TV systems. To satisfy these requirements the system of the circuit arrangement must be changed-over.

That is, when receiving the NTSC TV signal, the states of each of the transistors which constitute the system switch circuit 79 are inverted from those of the PAL signal reception. As a result, the transistors Q741, Q751 and Q755 turn on and the transistor Q760 turns off in the phase synthesizing circuit 88. When the transistor Q741 turns on, the transistors Q742 and Q743 turn off. Then, if the transistor Q751 turns on, the transistors Q752 and Q753 turn off. The subcarrier (B−YCW) for the (B−Y) demodulation may be obtained in the same way as in the case of the PAL signal reception.

Transistors Q749, Q750, Q751, Q752, Q753, Q755 and so on may constitute a second phase synthesizing circuit 88b. Since the resistor R733 is connected to the base of the transistor Q750, the first reference oscillating signal (a) is supplied to the base of the transistor Q750 when its absolute value is changed into K1·a, where 0<K1<1. Also the resistor R731 is connected to the base of the transistor Q749, so that the second reference oscillating signal (b) is supplied with changing its original absolute value into (K2·b). Consequently at the emitter of the transistor Q749 a vector signal K2·b−K1·a.

When the NTSC TV signal is received, as the flip-flop circuit 86 is interrupted and its output signals (P4) and (P5) are maintained at a low level, the transistors Q756, Q752, Q746, Q745, Q754, Q753, Q747 and Q744 turn off. As a result, a signal (K2a - K1a) having a phase of approximately 105° with respect to the (B−Y) axis may be conducted as the subcarrier (R−YCW) for the (R−Y) demodulation.

Adjustment of the phase may be realized by the vector synthesizing process. Particularly in this embodiment it is effected by properly selecting the resistance values of the resistors R732 and R731. The subcarrier (G−YCW) so obtained is supplied to a common base of the transistors Q867 and Q868 as shown in FIG. 7.

As explained hereinbefore, the subcarrier (R−YCW) for the (R−Y) axis is produced with having a phase of approximately 105° with respect to the subcarrier (B−YCW) for the (B−Y) axis. Furthermore the (R−Y) signal component in the (R−Y) demodulator 77 is supplied to the PAL matrix circuit 79 with the adjusted amplitude with respect to that of the (B−Y) signal component, which is adapted to demodulate the NTSC TV signal.

The (G−Y) axis will now be explained when receiving the NTSC TV signal. Even in case of the NTSC signal reception, the (G−Y) axis must have a phase similar to that of the PAL signal reception. However, when the system changes its reception mode from the PAL system to the NTSC system, the gain for the (R−Y) signal component becomes larger than that of the PAL signal reception in the PAL matrix circuit 75.

So if the (B−Y) and (R−Y) demodulation signals are merely matrixed in the (R−Y) demodulator 78 in the same way as in the PAL TV system, the (G−Y) axis will have the desired phase in the NTSC signal reception because of the different vector distribution between the above-mentioned demodulation signals. Consequently, when receiving the NTSC TV signal, the phase of the (G−Y) axis for the (G−Y) signal is required to be corrected.

Explanation will now be given of the correction means for the (G−Y) axis when receiving the NTSC TV signal.

When receiving the PAL TV signal, the (G−Y) demodulation signal is demodulated by matrixing the (B−Y) and (R−Y) demodulation signals. When receiving the NTSC TV signal, however, it is demodulated by utilizing the (B−Y) and (B−Y) demodulation signals and also the detection output of the subcarrier (G−YCW) for the (G−Y) demodulation and the (B−Y) signal component. That is to say, transistors Q764, Q765, Q767, Q768, Q769 and so on may constitute a third phase synthesizing circuit 88c in the phase synthesizing circuit 88. Since a resistor R737 is connected to the base of the transistor Q764, the first reference oscillating signal (a) which has been attenuated by ($l_1$·a) is supplied to the base of the transistor Q764, said $l_1$ being more than 0 and less than 1 ($0 < l_1 < 1$). Since a resistor R739 is connected to the base of the transistor Q765, the second reference oscillating signal (b) which has been attenuated by $l_2$·b is supplied to the base of the transistor Q765, said $l_2$ being more than 0 and less than 1 ($0 < l_2 < 1$). A vector signal ($l_2$·b − $l_1$·a) is obtained at the collector of the transistor Q764, which is supplied so as to generate the correction vector to a common base of the transistors Q872 and Q871 constituting the (G−Y) demodulator 78 as the subcarrier (G−YCW) for the (G−Y) demodulation. Then in the (G−Y) demodulator 78, the chroma signal supplied to the base of the transistor Q861 is multilied by the subcarrier (G−Y) for the (G−Y) demodulation. The resultant vector signal is identical to the correction vector signal which is one of the important elements for the matrix process. Under the above-mentioned process, the (G−Y) demodulation signal having the correct demodulation axis when receiving the NTSC TV signals is obtained.

Figure 14:
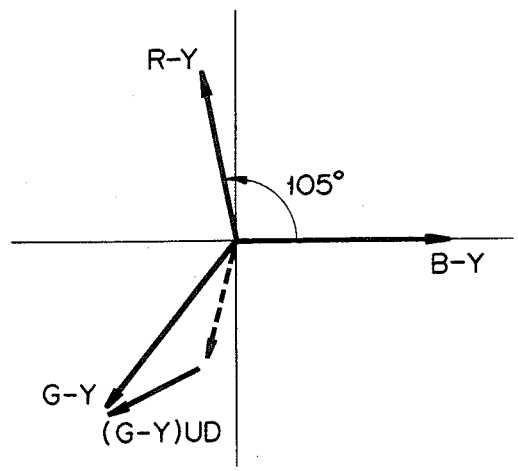
FIG. 14 shows a vector diagram explaining the operation of a (G−Y) demodulation axis of the demodulators and the phase synthesizing circuit.

That is, the matrix circuit designed to process the PAL TV signals cannot provide the correct (G−Y) axis for the NTSC TV signals, so that the correction subcarrier (G−YCW) is generated in the third phase synthesizing circuit 88c. As shown in FIG. 14 the correction vector (G−Y) UD is produced in such a manner that the (G−Y) axis is fitted on the solid line. As a result, the demodulation output signal in the correct (G−Y) axis can be obtained.

(3) - 3 Stabilization On Pases Synthesizing Operation In Second And Third Phase Synthesizing Circuits As previously explained, the phase synthesizing of the first reference oscillating signal (a) is effected in the phase synthesizing circuit. In this phase synthesizing operation it is necessary to take measures so that the synthesized signal output is not influenced by the hfe of the transistors concerned.

Description will now be given of such a measure involving the phase synthesizing circuit constructed by the transistors Q749 and Q750.

Figure 15A:
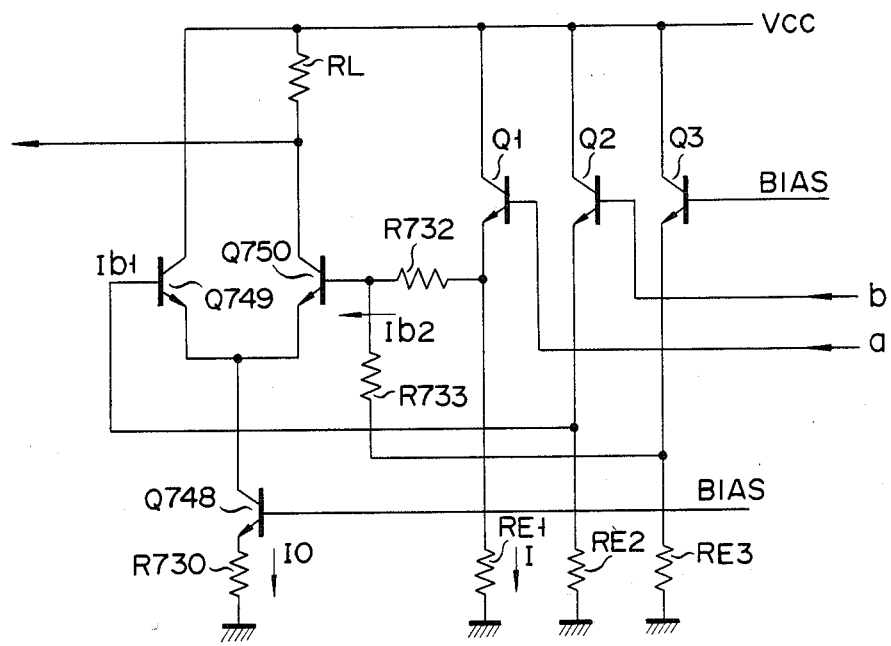
FIG. 15a shows a circuit diagram of a conventional phase synthesizing circuit.

Suppose that the resistor R733 is omitted from this phase synthesizing circuit. Then the following problem will occur. FIG. 15(a) shows a simplified circuit diagram of the phase synthesizing circuit from which the resistor R733 is omitted. This circuit has a drawback such that the phase synthesized output signal's level is stable. In the circuit shown in FIG. 15a, the first reference oscillating signal (a) is input to the base of the transistor Q750 via a signal path of the base-emitter of the transistor Q1 and the resistor R732, while the second reference oscillating signal (b) is input to the base of the transistor Q749 via a signal path of the base-emitter of the transistor Q2.

Figure 15B:
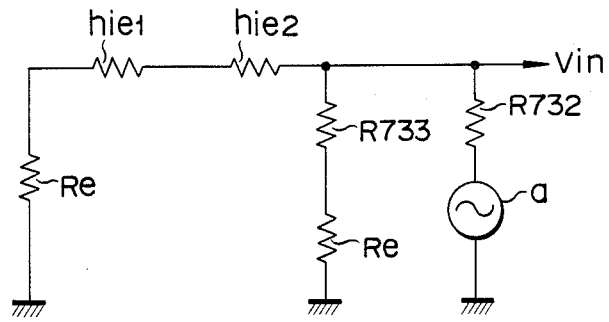
Figure 15C:
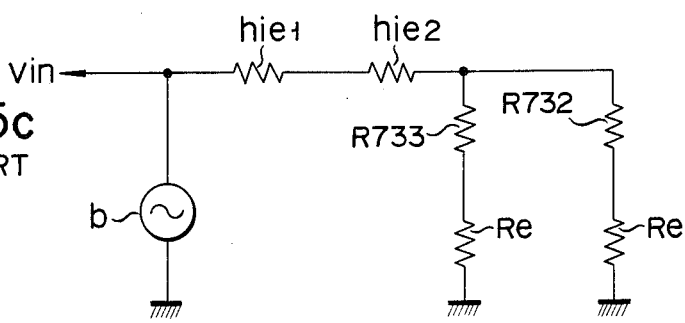
Figure 15D:
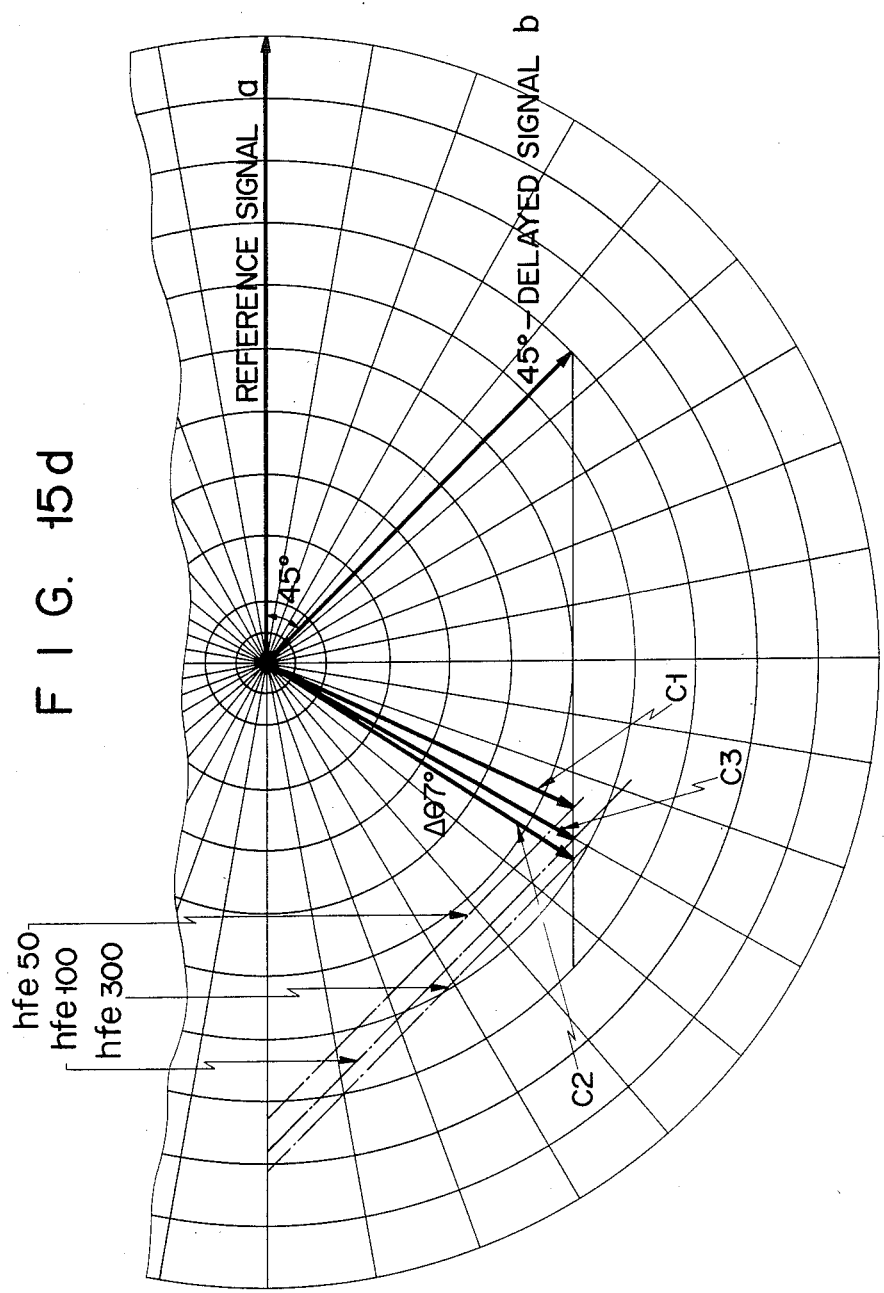

Assume that the resistor R732 has 1 KΩ and the resistor R733 has 5 KΩ. FIG. 15b is an equivalent circuit with respect to the first reference oscillating signal (a). FIG. 15c is an equivalent circuit with respect to the second reference oscillating signal (b). In accordance with those equivalent circuits, the base input voltages for the transistors Q749 and Q750 are calculated as follows:

$$hie1 = hie2 = \frac{VT}{ibl}$$

$$= \frac{kt}{q} \times \frac{2(hfe + 1)}{io}$$

where,
k: Boltzman's constant ($1.38 \times 10^{-23}$ JK$^{-1}$)
q: electron charge ($1.6 \times 10^{-19}$ coulomb)
T: absolute temperature (°K.)
KT/q=VT: 26 mV (T=300° K.)
re=kT/q×1/i=0.045 k The base input voltage Vin a of the transistor Q750 is calculated as follows:

$$Vin\ a = \frac{\frac{(2hie1 + re)(R733 + re)}{(2hie1 + 2re + R733)}}{\frac{(2hie1 + re)(R733 + re)}{(2hie1 + 2re + R733)}} \cdot a$$

The base input voltage Vin b of the transistor Q749 is expressed:

Vin b = b

If the hfe of the transistor concerned is varied to 50, 100 or 300, the input signal levels become 0.733a, 0.792a, 0.818a, b respectively. As a result, the synthesized vector (c) of the colour subcarrier of the output signal is amplified by the resistor devided Ka and b, so that the phase error among signal levels ΔQ becomes approximately 7°. That is, as shown in FIG. 5(d) the synthesized vectors C1, C2 and C3 are influenced by hfe of the relevant transitor. As described before, if the subcarrier varies, the correction colour demodulation cannot be expected. Further, when those phase synthesized outputs are used in the colour killer detection circuit, an error will occur in the colour killer operation.

Figure 16D:
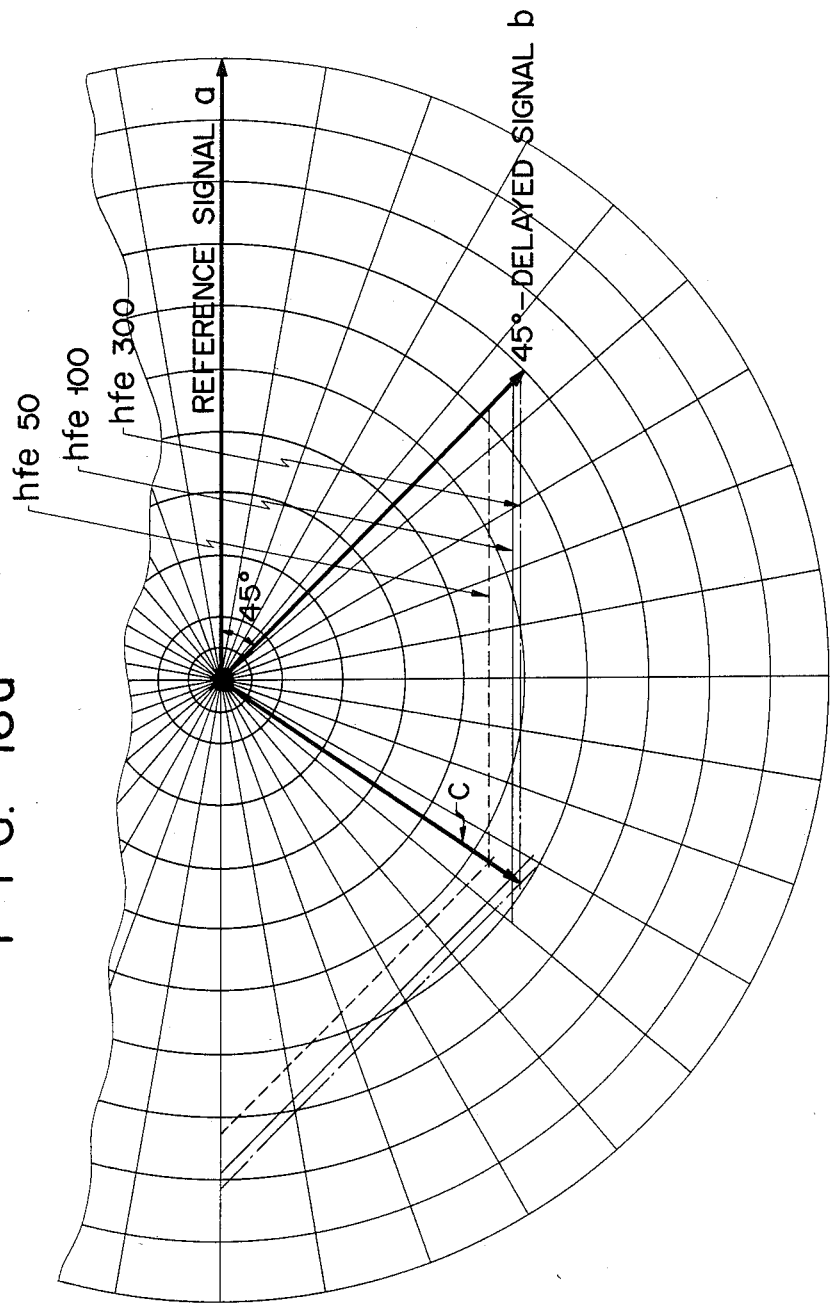

In accordance with the invention, the above-described phase variation may be prevented by introducing another resistor R731, as shown in FIG. 16a, so as to give substantially no influence to the phase synthesized signal outputs, thereby obtaining stable synthesized signal outputs.

The inventive measure will be explained with reference to FIG. 16a showing a simplified circuit diagram and FIGS. 16b and 16c showing equivalent circuits thereof. The base input voltage of the transistors Q749 and Q750 is calculated as follows: (the resistor R733=1 KΩ, the resistor R733=5 KΩ, and the resistor R731=800 Ω)

$$hie1 = hie2 = \frac{VT}{ibl} = \frac{kT}{q} \times \frac{2(hfe + 1)}{io}$$

$$re = \frac{kT}{b} \times \frac{1}{i} = 0.045\ k$$

The base input voltage Vin a of the transistor Q750 is obtained:

$$Vin\ a = \frac{\frac{(2hie1 + R731 + re) \times (R733 + re)}{2hie1 + R733 + R731 + 2re}}{\frac{(2hie1 + R731 + re) \times (R733 + re)}{(2hie1 + R733 + R731 + 2re)} + R1} \cdot a$$

The base input voltage Vin b of the transistor Q749 is obtained:

$$Vin\ b = \frac{\left\{\frac{(R732 + re)(R733 + re)}{(R732 + R733 + 2re)} + 2hie1\right\}}{\left\{\frac{(R732 + re)(R733 + re)}{R732 + R733 + 2re} + 2hie1\right\} + R731} \cdot b$$

If hfe varies to 50, 100 and 300, the input levels become 0.744a, 0.896b, 0.794a, 0.953b, 0.818a and 0.981b. The synthesized vector signal (c) has its phase error of approximately 1°, which is differentially amplified by the divided resistor Ka and b. Consequently, the resultant synthesized vector signal is not essentially influenced by hfe, thereby holding a stable phase. This advantage may give the correct colour demodulation and the correct phase detection operation.

(4) Colour Killer Detection and Colour Killer Operation

In accordance with the present invention, a subcarrier for the colour killer detection (Killer-CW) is also generated in the phase synthesizing circuit 88. Namely this subcarrier for the colour killer detection (Killer-CW) is derived from the collectors of the transistors Q762 and Q756 and then supplied to the colour killer detection circuit 83.

(4) - 1 Colour Killer Operation In Reception Of NTSC TV Signal

When receiving the NTSC TV signal, the transistor Q755 turns on, and the transistors Q756 and Q754 turn off in the phase synthesizing circuit 88. Therefore the resistor R734 works as a load for the transistor Q762. A second reference oscillating signal (b) appears at the collector of the transistor Q762 and is then supplied to the killer detection circuit 83 as the subcarrier for the colour killer detection (Killer-CW).

Figure 9:
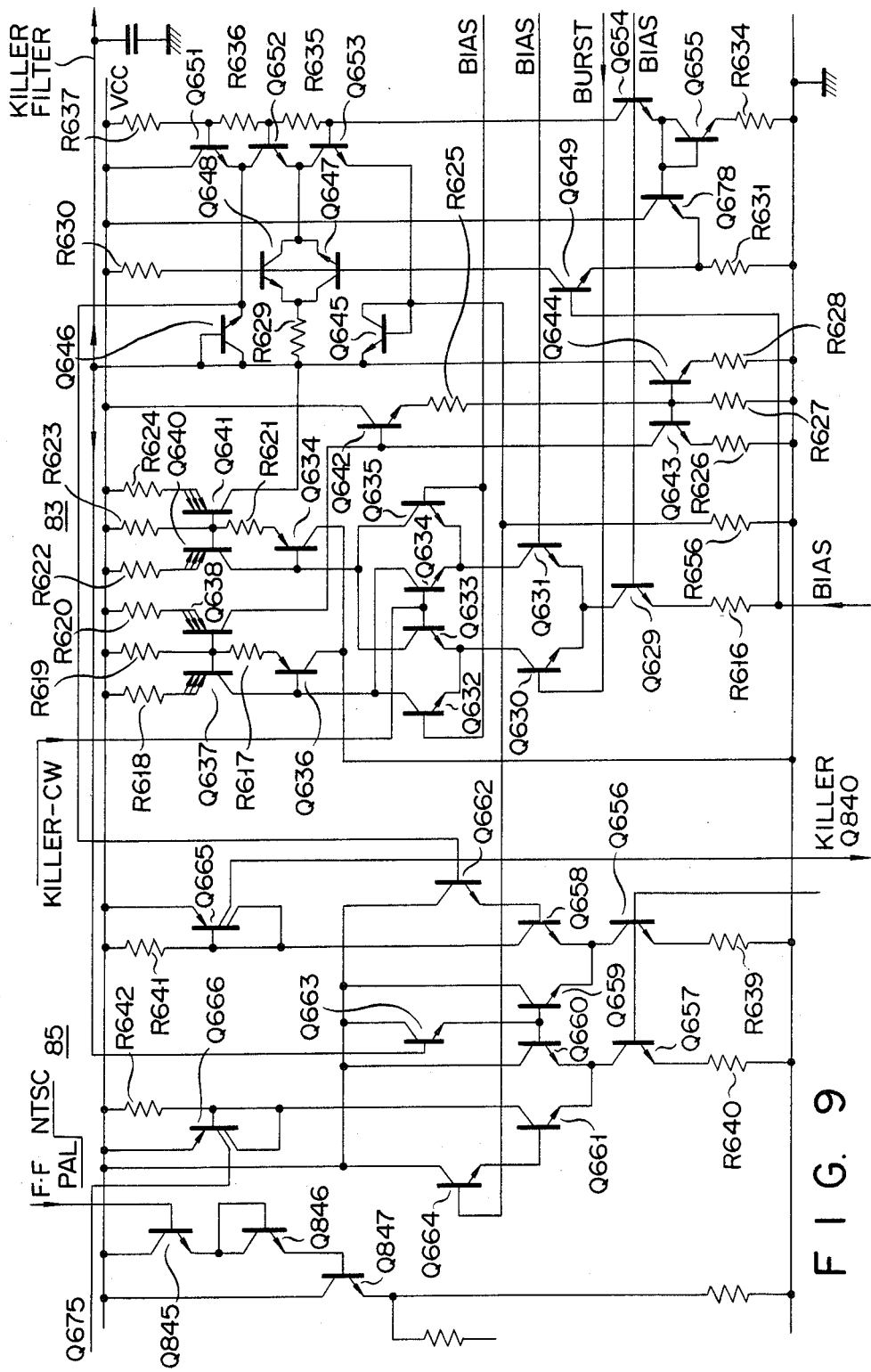
FIG. 9 shows a detailed circuit diagram of the killer detector and the ident/killer detector shown in FIG. 5.

FIG. 9 shows an ident and killer circuit of the killer detection circuit 83. The subcarrier for the killer detection (killer-CW) is supplied to the base of the transistors Q633 and Q634. Multiplication is effected be these transistors between the subcarrier for the killer detection supplied to the transistor Q633 and the burst signal supplied to the base of the transistor Q630. The resultant signal is used to control potential of the resistor R629 via a signal path of the base-emitter of the transistor Q634, the resistor R621, and the base-collector of the transistor Q641. As this resistor R629 is connected to a killer filter, its filtered voltage is applied to the base of the transistor Q633 constituting the ident and killer circuit 85.

If the burst signal is present and the killer filter voltage increases, the transistor Q633 turns on (since this explanation is made for receiving the NTSC TV signal, an operation of the ident circuit will be explained later). When the transistor Q633 turns on, currents passing through the transistors Q659 and Q660 increase and currents through the transistors Q658 and Q661 decrease, so that currents through transistors Q655 and Q666 decrease. As described above, when receiving the NTSC TV signal, if the burst signal is detected, the output of the transistor Q665 is applied to the transistor Q840 of the PAL matrix circuit 75 shown in FIG. 6, whereby the latter transistor is turned off. When the transistor Q840 turns off, the PAL matrix circuit 75 functions as a transmission path and a separation path for the chroma signal of the NTSC TV system.

When the burst signal is not detected in the killer detection circuit 83 and a voltage across the resistor R629 in the killer detection circuit 33 decreases, the output voltage of the killer filter decreases. Accordingly, a voltage subtracting the base-emitter voltage (VF) of the transistor Q663 from the output voltage of the killer filter is applied to the bases of the transistors Q660 and Q659, but these transistors turn off. As a result, the collector currents of the transistors Q661 and Q658 increase, which may cause that of the transistors Q666 and Q665 to be increased. If the collector current of the transistor Q665 increases, the base potential of the transistor Q840 in the PAL matrix circuit 75 rises and then this transistor turns on. When the transistor turns on, all transistors Q810, Q813, Q814 and Q817 in FIG. 6 turn off in spit of the PAL or NTSC signal process, the colour killer operation may be performed. Furthermore, the entire signal transmission path of the PAL matrix circuit 75 may be cut off by the collector output of the transistor Q665, and on the other hand, since this collector output is applied to a switch circuit (not shown) for switching the output of the bandpass filter in the colour control circuit 64, the output of the bandpass filter may be cut off, which provides a double killer operation.

Figure 10:
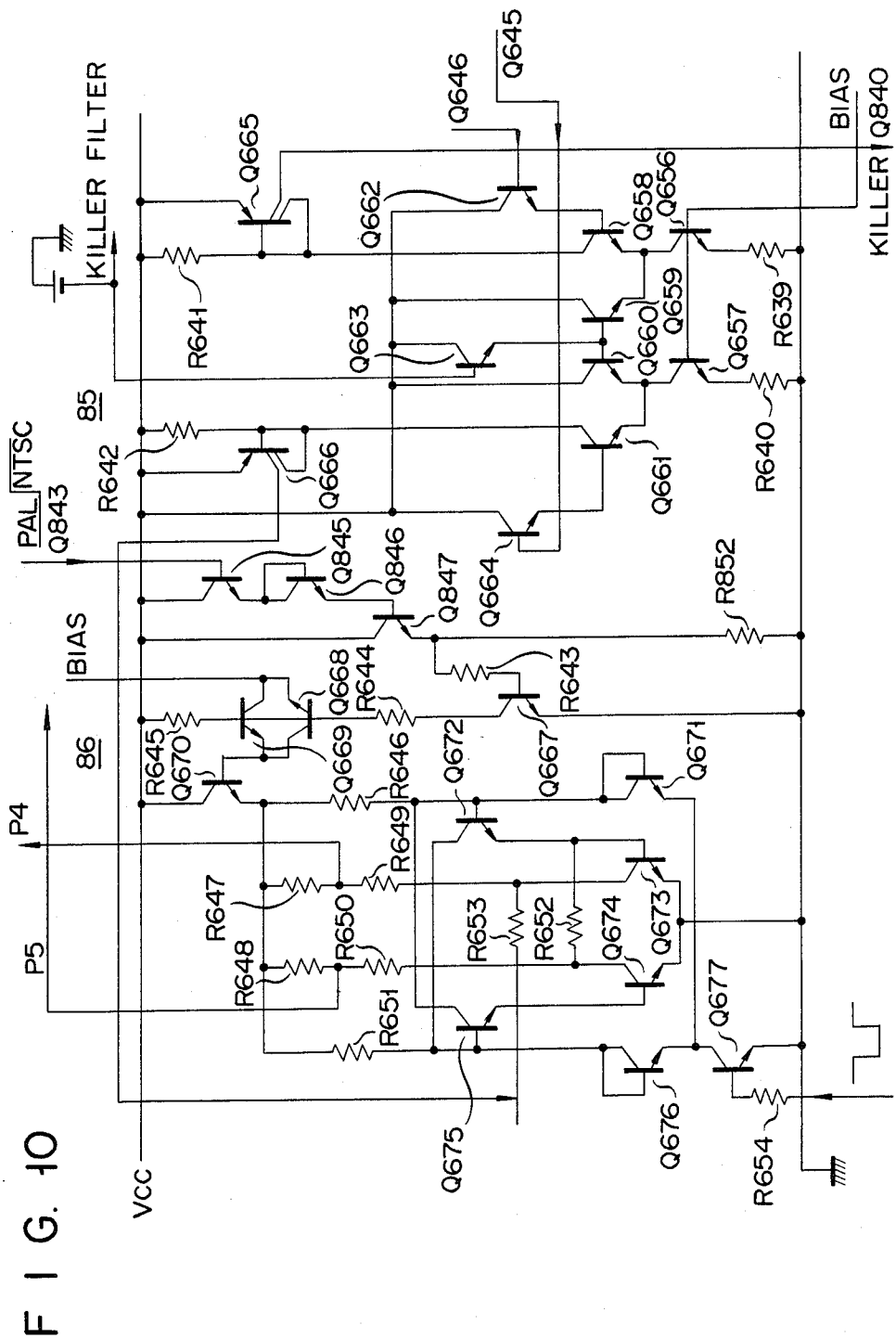
FIG. 10 shows a detailed circuit diagram of the flip-flop circuit and the ident/killer circuit shown in FIG. 5.

FIG. 10 shows a flip-flop circuit 86. When receiving the NTSC TV signal, since the collector potential of the transistor Q844 increases in the system switch circuit 79, the transistors Q845, Q846, Q847 and Q667 turn on in FIG. 10. Namely, during reception of the NTSC signal a switch constituted by the transistors Q668 and Q669 turn on, thereby turning off the transistor Q670. When the transistor Q670 turn off, no biasing voltage is applied to the flip-flop circuit 86 so that it is stopped. As a result, both outputs (R4) and (R5) of the flip-flop circuit 86 have low levels during reception of the NTSC TV signal.

(4) - 2 Colour Killer Operation And Ident Operation During Reception Of PAL TV Signal When processing the PAL TV signal, the subcarrier for the colour killer detection (Killer-CW) delivered from the phase synthesizing circuit 88 is inverted for every 1 horizontal synchronization period and then input to the killer detection circuit 83. This gives the following effect. In the PAL system, the phases of the burst signal and the (R−Y) axis are inverted for every 1 horizontal synchronization period, and this inverting operation is synchronized with the subcarrier (Killer-CW). During reception of the PAL TV signal the collector potential of the transistor Q843 in the system switch circuit 79 is maintained low. As a result, the transistors Q751 and Q755 turn off in the phase synthesizing circuit 88 shown in FIG. 8, so that there is the possibility that either a pair of the transistors Q753 and Q754, or a pair of the transistors Q752 and Q756 turns on. This can be determined by the conditions of the outputs (P4) and (P5) of the flip-flop circuit 86. That is, the output (P4) of the flip-flop circuit 86 is applied to the bases of the transistors Q752 and Q756 respectively, and the output (P5) of the flip-flop circuit 86 is to those of the transistors Q753 and Q754. If the output (P4) is high level and the output (P5) is low level, a signal (K2b−K1a) is derived as the subcarrier for the killer detection (Killer - CW) via the collector of the transistor Q750—the emitter-collector of the transistor Q756. In contrast to the above operation, when the output (p4) becomes low level and the output (P5) becomes high level, a signal (Kia−K2b) is derived as the subcarrier for the killer detection (Killer - CW) via the collector of the transistor Q749 and the emitter-collector of the transistor Q754. That is, depending upon the levels of the outputs (P4) and (P5) of the flip-flop crcuit 86, the subcarrier (Killer - CW) is derived as one signal (Kia−k2b) and another signal−(K1a−k2b) whose phase is inverted with respect to that of the first signal.

When receiving the PAL TV signal, since the collector potential of the transistor Q844 becomes high, the transistors Q758 and Q759 turn off in the phase synthesizing circuit 88.

As a result the transistor Q762 turns off and the resistor R734 functions as a load for either the transistor Q756 or Q752 every 1 horizontal sync period.

The subcarrier (Killer - CW) which is obtained in the previous operation is supplied to a common base of the transistors Q633 and Q634 in the killer circuit shown in FIG. 9. When receiving the PAL TV signal, the phase of the burst signal input to the colour killer detection circuit 83 is swung for every 1 horizontal sync period 40° with respect to the {−(B−Y)} axis.

As the collector potential of the transistor Q843 of the system switch circuit 79 in the flip-flop circuit 86 shown in FIG. 10 is kept low, the transistors Q845, Q846, Q847 and Q667 turn off and the transistors Q668 and Q669 constituting a switch turn off. As a result, the transistor Q670 turns on, so that the flip-flop circuit 86 is brought into an operation condition with a biasing voltage. Into the base of the transistor Q677 of the flip-flop circuit 86, a gate pulse is applied which is in synchronism with the horizontal sync period, with the result that the condition of the outputs (P4) and (P5) is inverted for every 1 horizontal sync period.

In the killer detection circuit 83 shown in FIG. 9, multiplication is performed between the subcarried (Killer - CW) whose phase is inverted by the outputs of the flip-flop circuits 86 and the burst signal whose phase is swung for every 1 horizontal sync period. Accordingly, the output obtained from the killer detection circuit 83 during receiption of the PAL TV signal may contain not only the information as to whether the colour killer operation is effected but also the information whether the inverted or non-inverted phase of the flip-flop circuit 86 is correct or incorrect.

If the phase invert of the subcarrier for the killer detection (Killer - CW) applied to the bases of the transistors Q633 and Q634 and the swing of the burst signal (±40°) have a correct relation, i.e., the subcarrier (Killer - CW) and the (R−Y) signal component are in the in-phase condition, currents flowing through the transistors Q634 and Q641 increase. If the current of the transistor Q641 increases a voltage across the resistor R629 increases and a voltage across the killer filer increases. Accordingly, the emitter current of the transistor Q663 of the ident and killer circuit 85 increases and the transistors Q660 and Q659 turn on. When these transistors turn on, the transistors Q661 and Q658 turn off, so that the transistors Q666 and Q665 turn off. Then no current flows from the collector of the transistor Q666 to the emitter of the transistor Q675 which constitutes the flip-flop circuit 86. This means that there is no control on the inverting and the non-inverting operations of the flop-flop circuit 86, and thus, the flip-flop circuit 86 may continue its present operation. Namely, when the phase of the subcarrier (Killer - CW) and the (R−Y) signal component of the burst signal are in-phase, the operation condition of the flip-flop circuit 88 is not controlled. The phase of the subcarrier (R−YCW) for the (R−Y) demodulation obtained from the second phase synthesizing circuit 88b in FIG. 8 is inverted for every 1 horizontal sync period by the outputs (P5) and (P4) of the flip-flop circuit 86. Furthermore, as previously described, when the flip-flop circuit 86 operates in a correct phase, the transistors Q661 and Q658 turn off, so that the transistors Q666 and Q665 turn off. When the transistor Q665 turns off, the collector output of the transistor Q840 is applied to the base of the transistor Q840 of the PAL matrix circuit 75, but the last-mentioned transistor is kept off. Consequently, as no killer operation is given to the PAL matrix circuit 75, this circuit works normally. As explained hereinbefore, when receiving the PAL TV signals, the adding and subtracting processes is performed for the chroma signal in the PAL matrix circuit 75, form which the (R−Y) and the (B−Y) signal components are derived.

Next, explanation will be given for receiving the PAL TV signal, in that the phase inverted condition of the subcarrier for the killer detection (Killer - CW) and that of the (R−Y) signal component of the burst signal are the reverse condition.

When the phase of the subcarrier (Killer - CW) and that of the (R−Y) signal component of the burst signal become a reverse phase condition, the detection voltage of the killer detection circuit 83 is as shown in FIG. 9. Namely, a voltage across the resistor R629 becomes small, and a voltage across the killer filer becomes small. Accordingly, the emitter potential of the transistor Q663 of the ident and killer circuit 86 becomes low, the transistors Q660 and Q659 turn off, and the transistors Q661 and Q658 turn on. When the transistors Q661 and Q658 turn on, the transistors Q666 and Q665 turn on. When the transistor Q666 turns on, a current of its collector is supplied to the emitter of the transistor Q675 of the flip-flop circuit 86, i.e., the base of the transistor Q674, so that the phase of the flip-flop circuit 86 is inverted.

That is, the transistor Q674 in the flip-flop circuit 85 turns on regardless of whether a pulse appears or does not appear at the base of the transistor Q675. This state may continue until the base voltage of the transistor Q66 equal to a voltage defined by (filter output voltage−VF) exceeds (VL−VF), where VL is a voltage predetermined by the internal bias. The phase of the subcarrier for the killer detection (Killer - CW) applied to the killer detection circuit 83 is preset near the (R−Y) axis in such a manner that it becomes large when the (R−Y) axis component of the burst signal is positive and becomes small when it is negative. Simultaneously, the phase of the subcarrier for the killer detection (Killer - CW) when the flip-flop circuit 86 is brought into the interrupting mode by means of the ident signal, is preset so that the (R−Y) axis component is positive. As a result, from an instant when the flip-flop circuit 86 interrupted, the killer voltage in the killer detection circuit 83 has a large, positive output and a small, negative output. Finally the output voltage V0 of the killer filter increases. At an instant when this filter output voltage VO is equal to or greater than the voltage VL, the transistors Q660 and Q661 of the ident and killer circuit 85 are inverted and therefore the transistor Q660 turns off. The base voltage of the transistor Q674 of the flip-flop circuit 86 is controlled by the transistor Q677, so that the flip-flop circuit 86 commences the inverting and non-inverting operations from the next horizontal sync pulse. If at this timing, there exists a correct phase relation between the (R−Y) signal component of the input burst signal and the subcarrier for the killer detection (Killer - CW), the killer detection voltage increases further, with the result that the killer comparators of the transistors Q659 and Q658 and inverted. As a result, the transistor Q665 turns off and the colour killer condition is released, so that the entire system is changed to the colour reception mode, whereby the formal colours appear in the screen.

Another observation will be given for the case of VO≧VL where the flip-flop circuit 86 beings the inverting and non-inverting operations. There is some degree of probability that a 180° phase difference might exist between the (R−Y) component of the input burst signal and the subcarrier for the killer detection (Killer - CW). In this case, the killer detection output begins to drop from VO≃VL, and after several horizontal sync periods the transistors Q661 and Q660 for the ident comparator are inverted, so that the transistor Q666 turns on so as to compulsorily set the base of the transistor Q674 to a high level, and thus the operation of the flip-flop circuit 86 is interrupted. Accordingly, the output voltage VO of the killer filter again starts to increase toward the voltage VL. When the voltage VO is equal to or larger than VL, it can be determined whether VO increases further or decreases again in relation to the (R−Y) component of the burst signal and the subcarrier (Killer - CW). In practice, a 50% probability exists whether the phase relation between the (R−Y) component of the burst signal and the subcarrier (Killer - CW) is correct or incorrect when the interruption of the flip-flop circuit 86's operation is released. Consequently, an error release probability of the flip-flop circuit 86 is reduced in inverse proportion to the number of repetitions of the flip-flop circuit 86, so that the entire system returns to the normal colour reception condition.

As described above, when the phase relation between the (R−Y) component of the burst signal and the subcarrier (Killer - CW) is incorrect, the operation of the flip-flop circuit 86 is interrupted for a moment and then restarted by means of the ident comparator consisting of the transistors Q661 and Q660 in the ident and killer circuit 85. Furthermore, in the ident and killer circuit 85, since the killer comparator is constructed by the transistors Q659 and Q658, the killer voltage is output via the collector of the transistor Q665.

It is important to note that each inverting operation of the ident comparator and the killer comparator in the ident and killer circuit 85 shown in FIG. 10 may not occur at the same timing, but may be set at different operation levels. That is, the base of the transistor Q664 which may supply a current to the base of the transistor Q661 is connected to the base-collector junction of the transistor Q645 which constitutes the biasing circuit for the killer detection portion. On the other hand, the base of the transistor Q662, which may supply a current to the base of the transistor Q658, is connected to the base-collector junction of the transistor Q646 which constitutes the biasing circuit for the killer detection portion.

As a consequence, when the error phase relation occurs between the subcarrier (Killer - CW) and the (R−Y) signal component of the burst signal during the reception of the PAL TV signal, the killer detection voltage becomes low (lower than the setting voltage VL), so that the operation of the flip-flop circuit 86 is interrupted (bit it restarts in response to an increase of the killer detection voltage) and also the colour killer operation is realized.

When no burst signal is received during the PAL signal reception, the colour killer operation is realized. In this case the killer detection voltage VO is: VL≦VO≦VH. Accordingly, the operation of the flip-flop circuit 85 continues.

Then, when the phase relation between the above-described signals is correct, a higher voltage than VH is obtained as the killer detection voltage and both transistors Q665 and Q666 turn off. Namely, if the detection output is greater than VH as shown in FIG. 17, the interruption of the operation of both the colour killer and the flip-flop circuit is not realized. If the detection output VO is: VH≧VO≧VL, only the colour killer operation is realized. Finally, if the voltage VO is smaller than VL, both the colour killer operation and the flip-flop circuit are controlled.

What we claim is:

1. A circuit arrangement for processing colour television signals, in which a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are guadrature-modulated on first and second modulation axes respectively, first and second subcarriers for demodulating said first and second colour difference signals being not inverted every horizontal line, comprising:

means for generating said second subcarrier which is used to demodulate said first composite colour signal and separated at a right angle with respect to said first subcarrier;

means for correcting a phase difference of said second subcarrier with respect to said first subcarrier to a certain angle, excluding 90 degrees, when demodulating said second colour difference signal of said second composite colour signal; and means for performing colour killer detection of said first conposite colour signal in such a manner that a colour burst signal in said first composite colour signal and a colour killer detection subcarrier having said corrected phase difference are phase-detected.

2. A circuit arrangement for processing colour television signals as claimed in claim 1, wherein:
said first composite colour signal is a PAL composite colour signal;
said second composite colour signal is an NTSC composite colour signal; and
when denodulating said PAL composite colour signal, said colour killer operation is performed by a signal which is obtained by multiplying said phase-corrected second subcarrier of the NTSC composite colour signal by said colour burst signal in said PAL composite colour signal.

3. A circuit arrangement for processing colour television signals, in which a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are guadrature-modulated on first and second modulation axes respectively, first and second subcarriers for demodulating said first and second colour difference signals being not inverted every horizontal line, comprising:
a first differential switching circuit into which a delayed signal is supplied via time delay means having one horizontal line and from which said delayed signal is delivered under the control of a first control signal;
a second differential switching circuit into which an undelayed signal is supplied and from which, under the control of a second control signal, one signal whose phase is in phase with that of said undelayed signal and another signal whose phase is opposite to that of said undelayed signal are delivered;
a signal matrix circuit in which said signals output from said first and second differential switching circuits, are vector-summarized and are performed in a vector-subtraction when processing said first composite colour signal, and from which results of said vector calculations are delivered through a first and second output terminals;
a system switch control circuit for generating a third control signal by which the matrix operation of said signal matrix circuit can be interrupted when processing said second composite colour signal, and a fourth control signal by which switching states of said first and second differential switching circuits can be changed over, so that said delayed signal is blocked at the output terminal of said first differential switching circuit and so that the supplying of the inverted signal of said second differential switching circuit into said signal matrix circuit is blocked; and
means for controlling gains of said first and second differential switching circuits under the control of the outputs from said system switch control circuit by changing over resistor networks constituting said signal matrix circuit under the control of the outputs from said system switch control circuit.

4. A circuit arrangement for processing colour television signals as claimed in claim 3, further comprising:
at least a resistor different from resistors connected to said first and second differential switching circuits so as to constitute said signal matrix circuit which constitutes a phase shift compensation circuit in conjunction with a substrate capacitance present in collectors of transistors of said first and second differential switch circuits whose gains are controllable under the influence of the outputs from said system switch control circuit, relative signal phase errors between the outputs of said signal matrix circuit being reduced both when said signal matrix circuit is used as a transmission circuit for said second composite colour signal and when said first composite colour signal is processed.

5. A circuit arrangement for processing colour television signals, in which a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are guadrature-modulated on first and second modulation axes respectively, first and second subcarriers for demodulating said first and second colour difference signals being not inverted every horizontal line, comprising:
a system switch circuit for generating a system control signal which defines the process for one of said first and second composite colour signals;
a matrix circuit in which, when processing said first composite colour signal, a vector calculation is performed for the colour difference signals transmitted with respect to said first and second demodulation axes, and which when processing said second composite colour signal, has a signal transmission function for said first composite colour signal, and generates a second composite colour signal whose amplitude is controlled in response to the vector results or said system control signal appearing at first and second output terminals; and
a demodulation circuit in which the colour difference signals with respect to said different demodulation axes appearing at said first and second output terminals whose amplitudes are controlled by each other, are processed in a common network with respect to said first and second composite colour signals.

6. A circuit arrangement for processing colour television signals as claimed in claim 5, wherein:
said first composite colour signal is a PAL composite colour signal;
said second composite colour signal is an NTSC composite colour signal; and
DC components of the signals appearing at said first and second output terminals of said matrix circuit are interrupted by first and second capacitors and the remaining signals are supplied to said colour demodulation circuit.

7. A circuit arrangement for processing colour television signals as claimed in claim 5, wherein:
said first composite colour signal is a PAL composite colour signal;

said second composite colour signal is an NTSC composite colour signal; and said matrix circuit is constructed by resistor networks, and relative amplitude ratios of said first and second demodulation axes are maintained at given values by controlling said system switch circuit to change said resistor networks.

8. A circuit arrangement for processing colour television signals, in which a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are guadrature-modulated on first and second modulation axes respectively, first and second subcarriers for demodulating said first and second colour difference signals being not inverted every horizontal line, comprising:

a colour killer detection circuit having one input terminal into which burst signals of said first and second composite colour signals are supplied, and another input terminal into which a subcarrier for the colour killer is supplied, said signals supplied to said input terminals being phase-detected;

an ident circuit in which when processing said first composite colour signal, an invert control signal is generated to invert a subcarrier with respect to said second demodulation axis every horizontal line in response to the detector output of the colour killer detection circuit, and which discriminates whether a phase of said subcarrier is synchronized with that of said burst signal in said first composite colour signal;

a flip-flop circuit whose output states are controlled to be first and second voltage levels in response to the output of the ident circuit;

phase changing means for inverting the phase of the subcarrier with respect to said second demodulation axis in accordance with the outputs of said flip-flop circuit and for responding to an output state of a system switch circuit from which a control voltage is generated to define whether said first or second composite colour signal is processed; and flip-flop interrupting means which interrupts said flip-flop circuit by dropping the output voltage of said system switch circuit when processing said second composite colour signal and interrupting said phase changing means by setting said output levels of the flip-flop circuit to a third voltage level which is lower than said first and second voltage levels, said flip-flop circuit being interrupted when processing said second composite colour signal and an inversion of the subcarrier by means of said phase changing means being firmly interrupted.

9. A circuit arrangement for processing colour television signals as claimed in claim 8, wherein:

said first composite colour signal is a PAL composite colour signal;

said second composite colour signal is an NTSC composite colour signal; and multiplication is performed to derive a signal when the PAL composite colour signal is processed, between the signal component for the (R−Y) demodulation axis by the (R−Y) axis demodulation signal generating means for the NTSC signal and the burst signal of the PAL composite colour signal.

10. A circuit arrangement for processing colour television signals, in which a first composite colour signal and a second composite colour signal are independently processed, said first composite colour signal includes first and second colour difference signals which are quadrature-modulated on first and second modulation axes respectively, a first subcarrier for demodulating said first colour difference signal being not inverted every horizontal line and a second subcarrier for demodulating said second colour difference signal being inverted every horizontal line, and said second composite colour signal includes first and second colour difference signals which are guadrature-modulated on first and second modulation axes respectively, first and second subcarriers for demodulating said first and second colour difference signals being not inverted every horizontal line, comprising:

a system switch circuit for selecting whether said first or second composite colour signal is to be processed;

an inverted phase signal amplifier for amplifying an inverted phase signal of said first composite colour signal when said system switch circuit is selected in the mode of processing said first composite colour signal;

a non-inverted phase signal amplifier for amplifying the non-inverted phase signal of said first composite colour signal;

a first vector adding circuit for vector-adding the output of said non-inverted phase signal amplifier and the output of said inverted phase signal;

a second vector adding circuit for vector-adding said inverted phase signal and a signal obtained by inverting said non-inverted phase signal; and signal gain controlling means in which the signal inverting operation of the inverting phase signal amplifier is interrupted when said system switch circuit is selected in the mode of processing said second composite signal, and at the outputs of said first and second vector adding circuits, a signal for processing second composite colour signals whose gains are different from each others by controlling absolute values of the vectors in said first and second vector adding circuits.

11. A circuit arrangement for processing colour television signals as claimed in claim 10, wherein:

said first composite colour signal is a PAL composite colour signal;

said second composite colour signal is an NTSC composite colour signal; and said matrix circuit is constructed by resistor networks and a relative amplitude ratio of said first and second demodulation axes is maintained at a given value by changing said resistor networks using said system switch circuit.

12. A circuit arrangement for processing colour television signals as claimed in claim 10 wherein:

an amplitude ratio between the output signal of said first demodulator and that of said second demodulator is equal to 1.8 when said first composite colour signal is processed.

13. A circuit arrangement for processing colour television signals comprising:

a first colour demodulator for demodulating a composite colour signal by a first colour subcarrier having a first phase with respect to a first demodulation axis;

a second colour demodulator for demodulating said composite colour signal by a second colour subcarrier having a second phase with respect to a second demodulation axis;

a matrix circuit for producing a colour demodulation signal having a third phase with respect to a third demodulating axis by vector-synthesizing the colour demodulation signals delivered from said first and second colour demodulators; and means for generating a correction vector signal so as to correct said third phase of the colour demodulation signal produced by said matrix circuit in such a manner that said correction vector signal is added to said colour demodulation signal of the matrix circuit so as to shift said third phase of the colour demodulation signal with respect to said third demodulation axis.

14. A circuit arrangement for processing colour television signals as claimed in claim 13, wherein:

said correction vector generating means includes;

a first vector signal generating circuit for producing a signal having a first phase;

a second vector signal generating circuit for producing a signal having a second phase which is shifted by a predetermined phase from said first phase;

a differential amplifier having a first transistor into which said signal having said first phase is supplied, and a second transistor constituting a defferential pair for said first transistor, into which said signal having said second phase is supplied;

a first resistor for applying a given biassing voltage to said first transistor;

a second resistor for applying an output signal to the base of said first transistor, which is obtained to attenuate the output signal of said first vector signal generating circuit;

a third resistor for applying an output signal to the base of said second transistor, which is obtained to attenuate the output signal of said second vector signal generating circuit; and a load for said differential amplifier for synthesizing said first and second vector signals, a phase variation of the correction vector signal at said load being prevented.

15. A circuit arrangement for processing colour television signals comprising:

a first phase detection circuit which has one input terminal into which a colour difference signal having a phase with respect to a first demodulation axis is supplied, and another input terminal into which a subcarrier on said first demodulation axis is supplied, and which phase-detects said two signals;

a second phase detection circuit which has one input terminal into which a colour difference signal having a phase with respect to a second demodulation axis is supplied, and another input terminal into which a subcarrier on said second demodulation axis is supplied, and which phase-detects said both signals;

a matrix circuit which synthesizes a demodulation signal with respect to a third demodulation axis by vector-synthesizing the output of said first phase detection circuit and that of said second phase detection circuit;

phase control means in which the phase of the subcarrier with respect to said second demodulation axis which is supplied to said other input terminal of said second phase detection circuit, is inverted every horizontal line during the PAL signal process, and the phase of the subcarrier with respect to said second demodulation axis is different from that during the PAL signal reception when the NTSC TV signal is processed; and means for maintaining a relative amplitude ratio between the output signals of said first and second phase detection circuits to a given value without varying the signal gains of said first and second phase detection circuits during the NTSC and PAL signals reception, DC levels of the output signals of said first and second phase detection circuits being not varied and said amplitude ratios for each of the PAL and NTSC TV systems being maintained to respective given values.

* * * * *